Jan. 10, 1967   G. R. ENGLUND ET AL   3,296,961
RECORDING ASSEMBLY FOR ACCOUNTING MACHINE
Original Filed March 14, 1962   21 Sheets-Sheet 1

INVENTORS
GOSTA R. ENGLUND AND
MATS E. MATTSSON
by
Mason, Kolehmainen, Rathburn and Wyss
ATTORNEYS

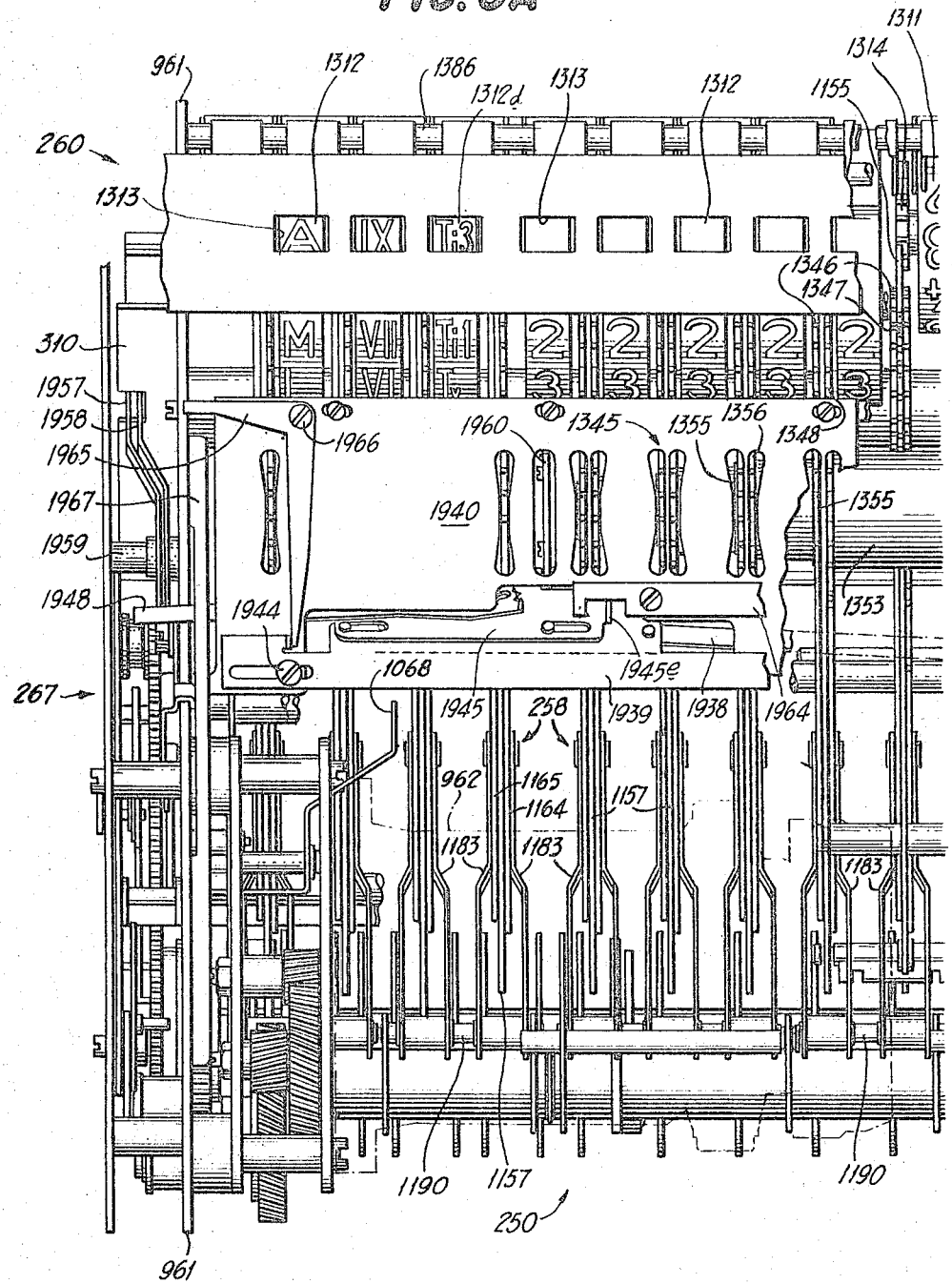

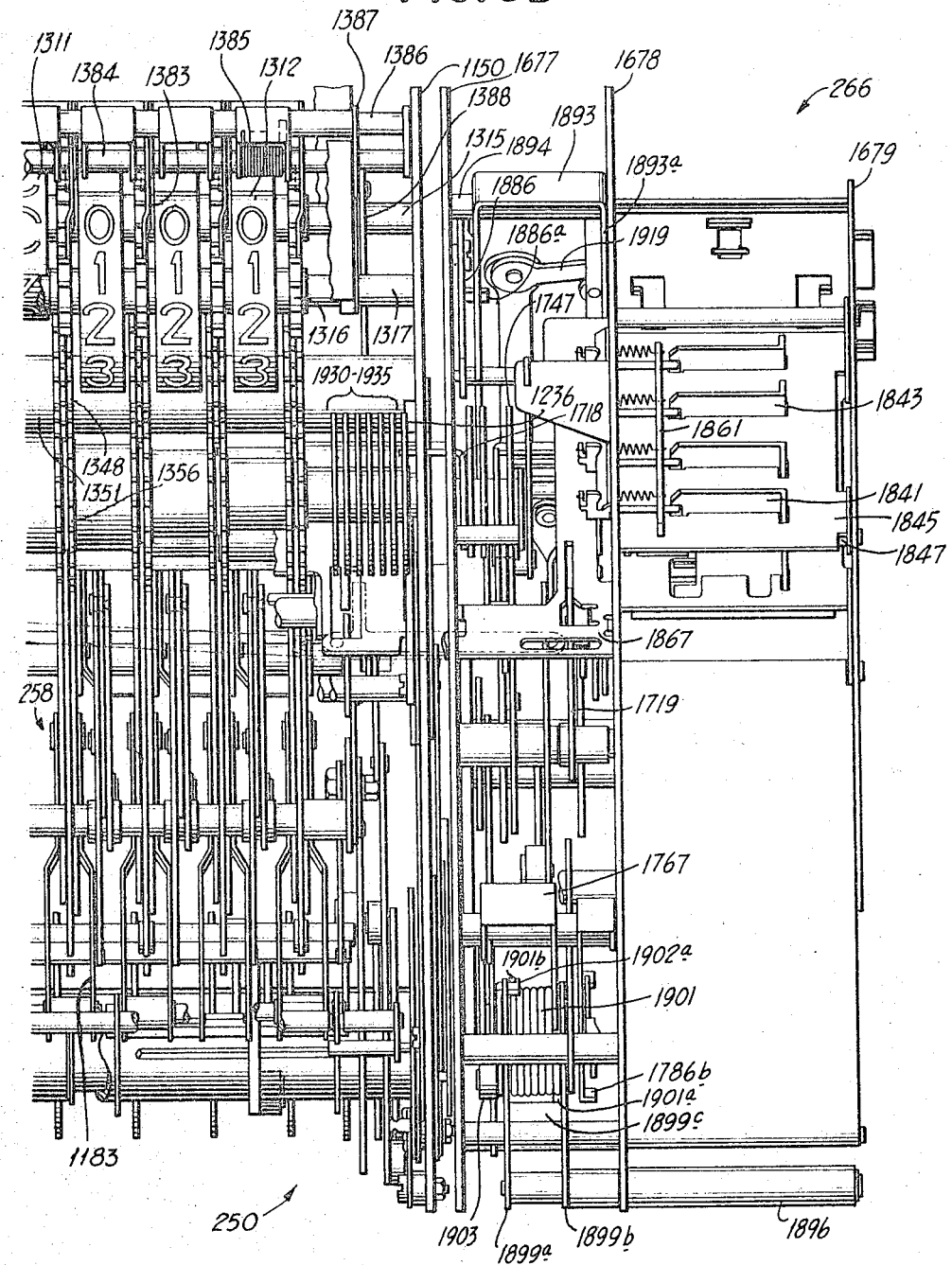

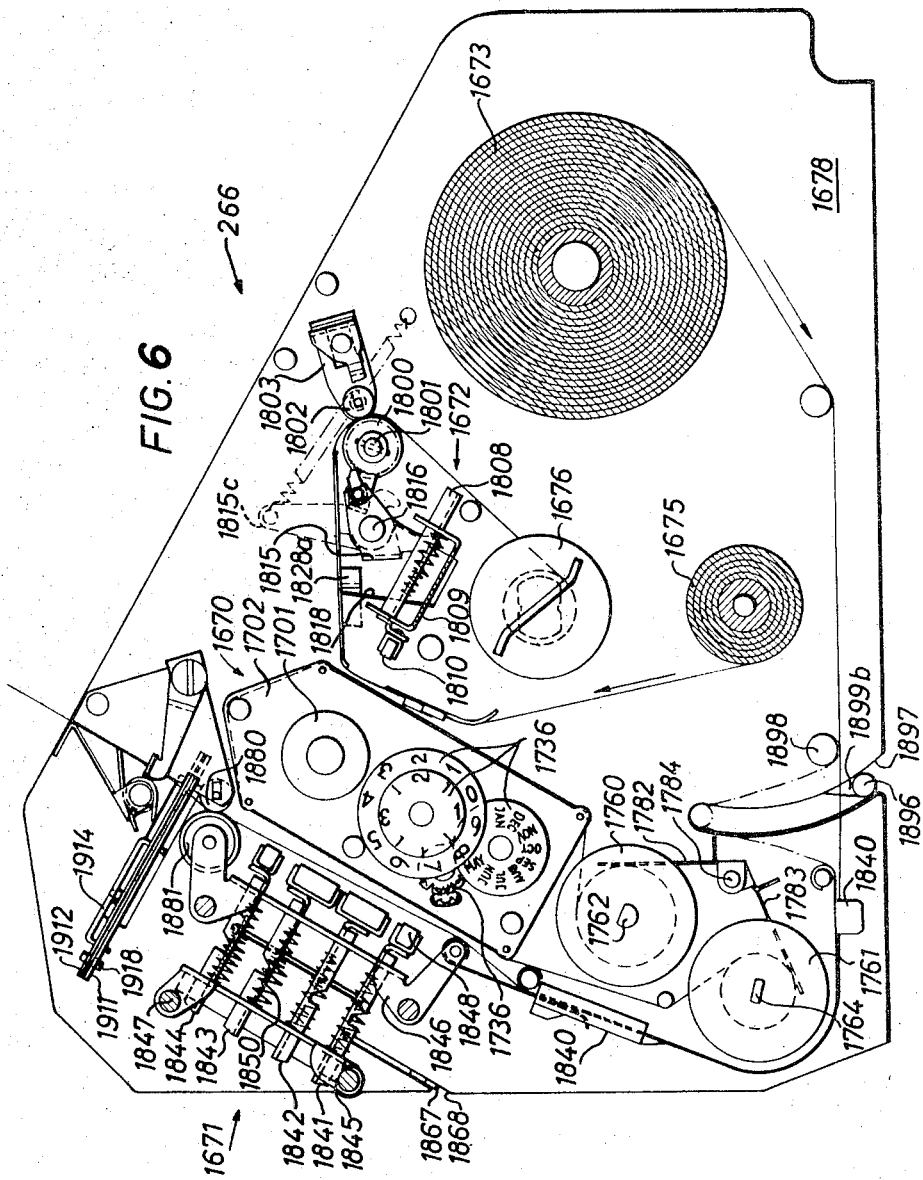

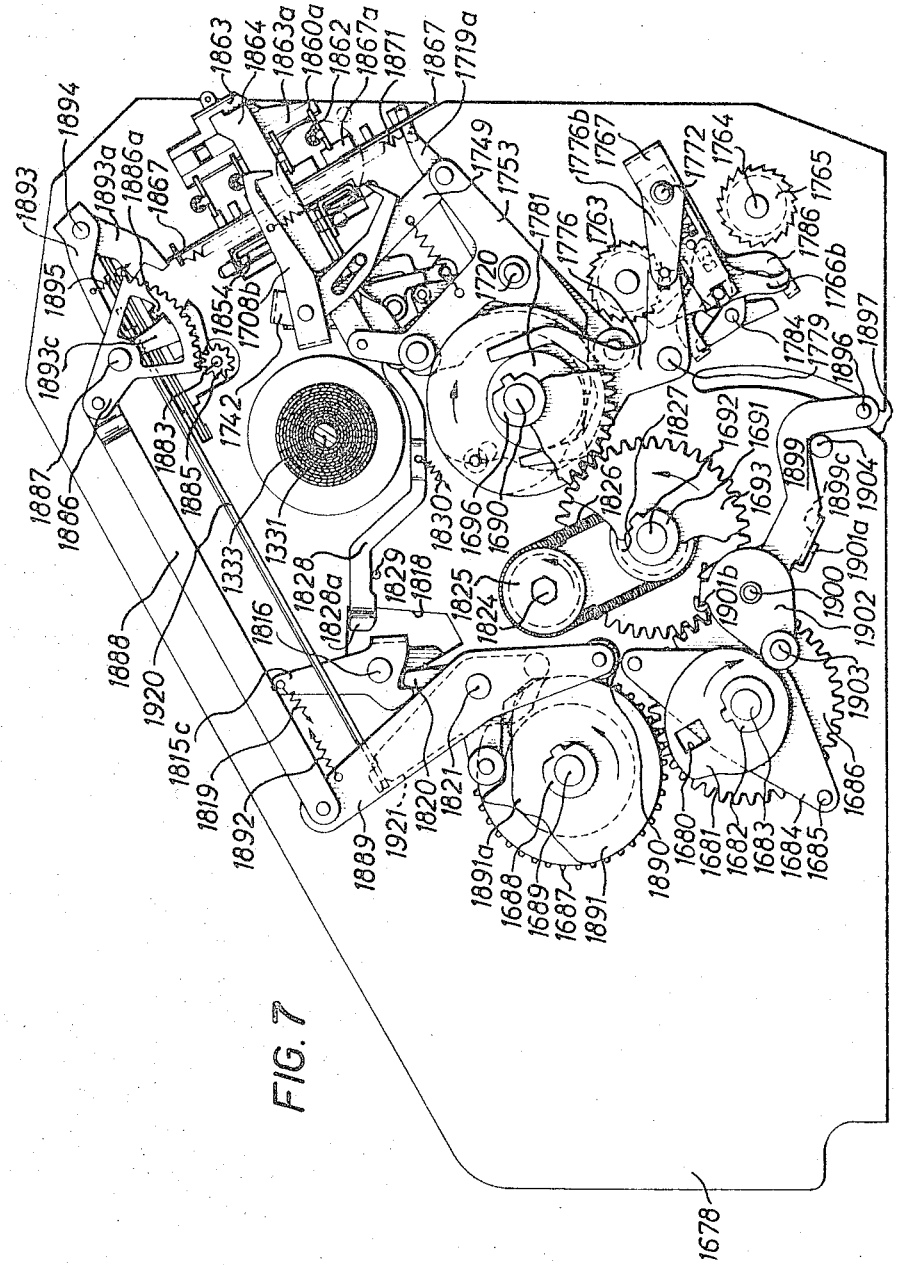

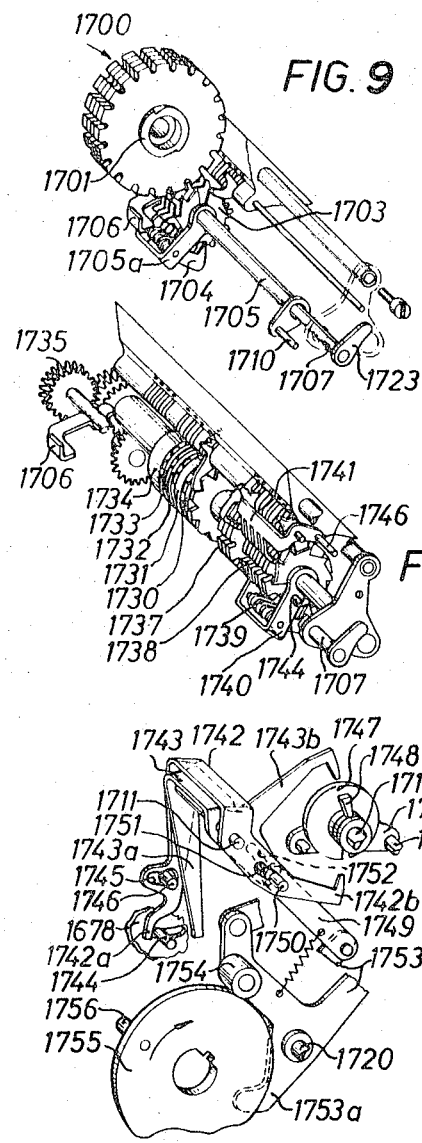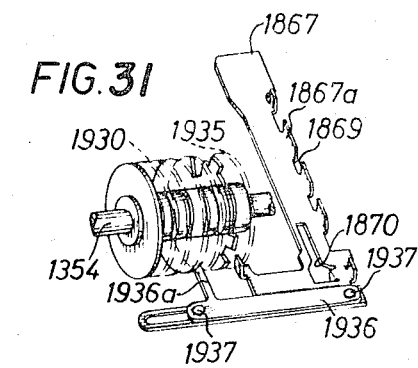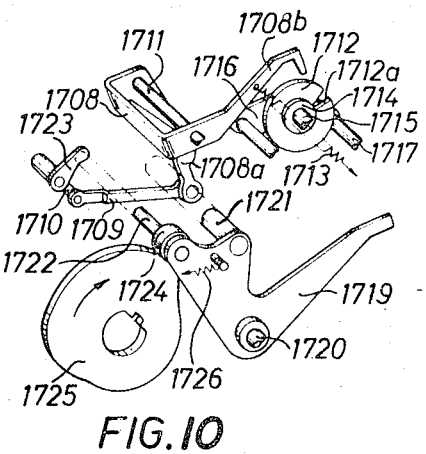

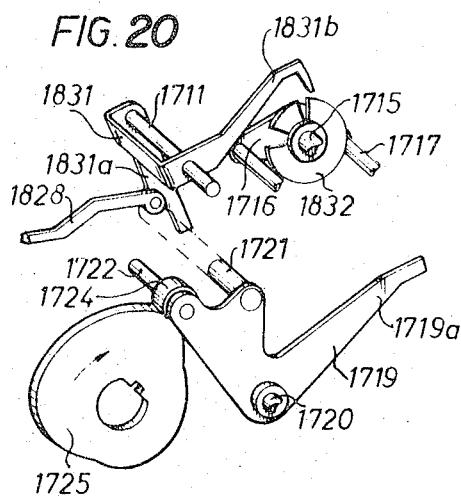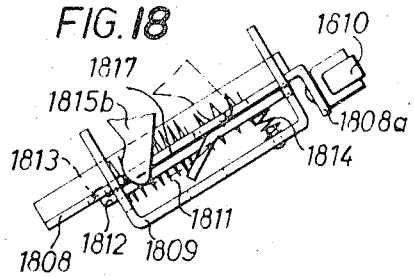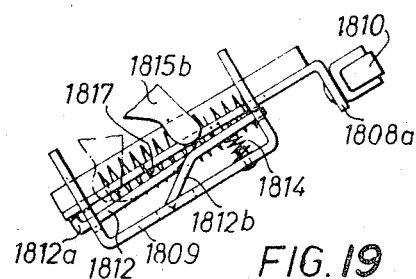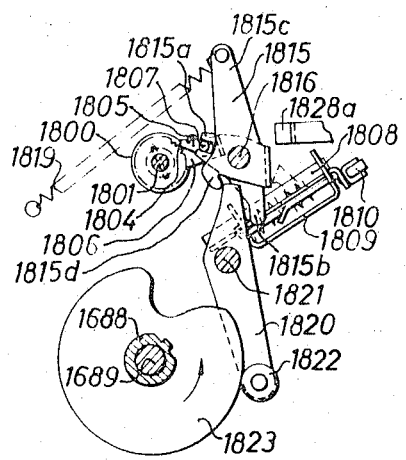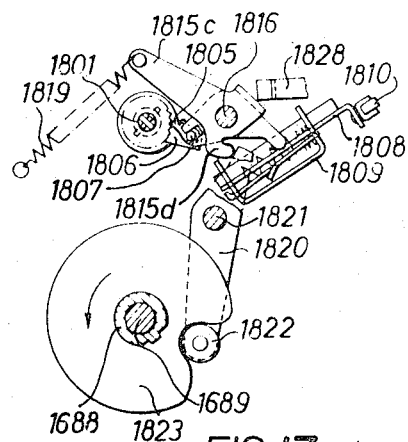

Jan. 10, 1967   G. R. ENGLUND ET AL   3,296,961
RECORDING ASSEMBLY FOR ACCOUNTING MACHINE
Original Filed March 14, 1962   21 Sheets-Sheet 17
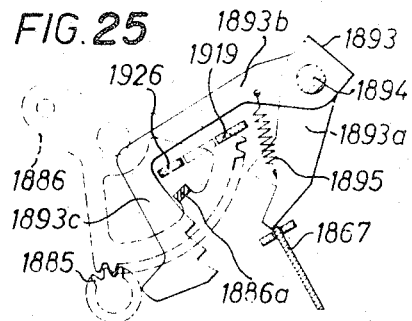
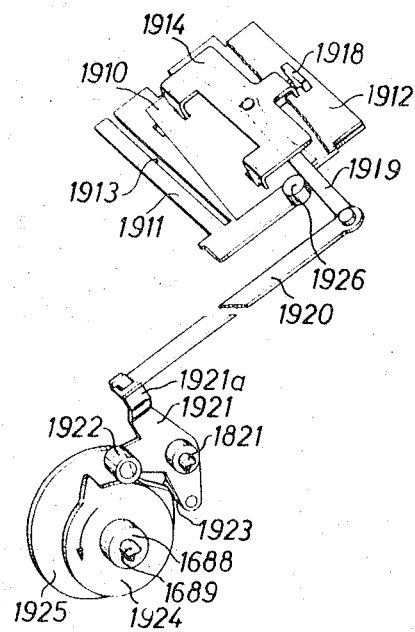
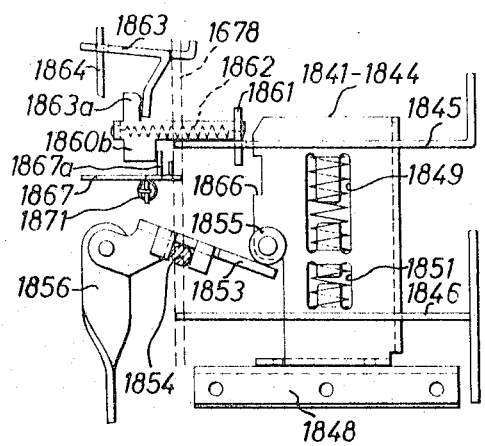
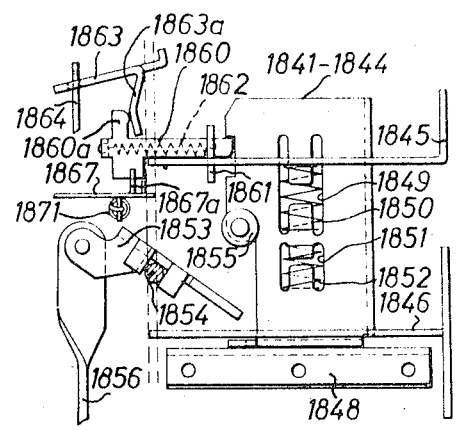

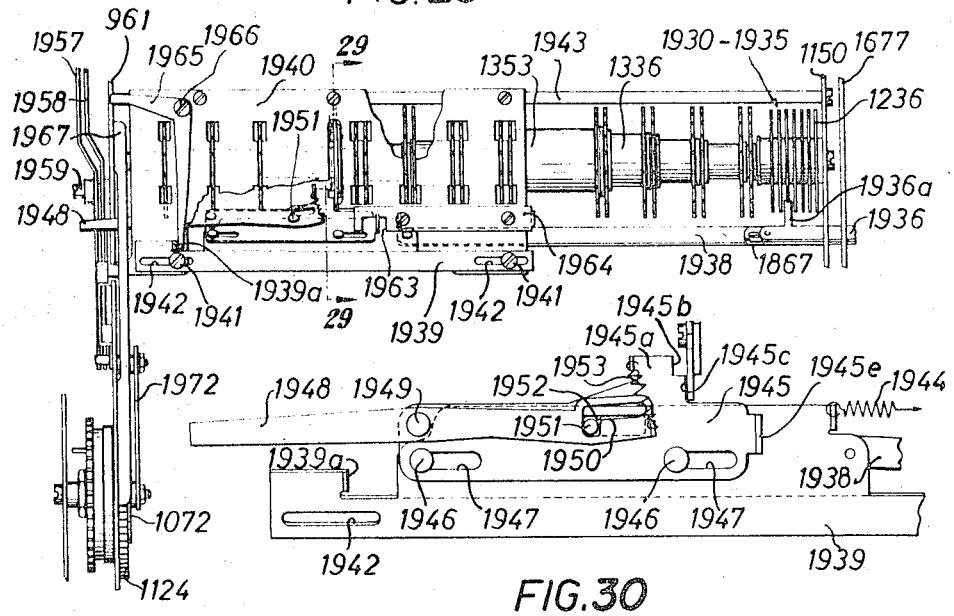
FIG. 28
FIG. 30
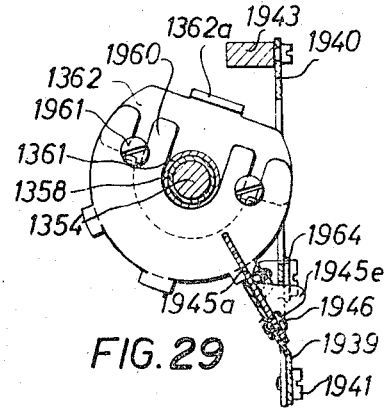
FIG. 29

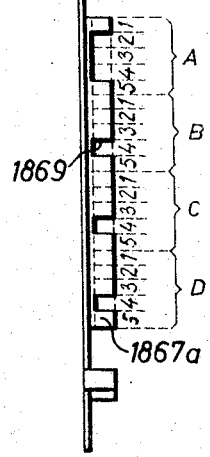
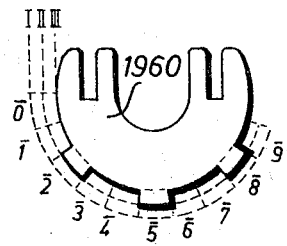
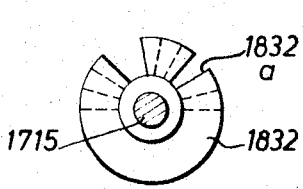
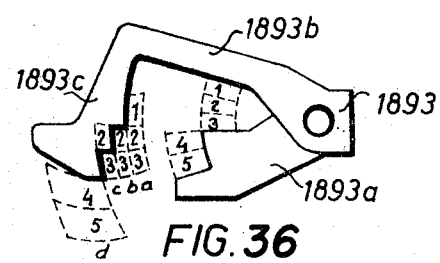
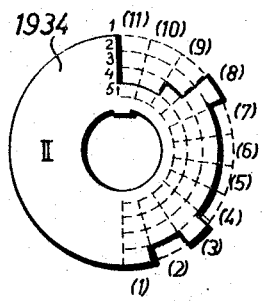
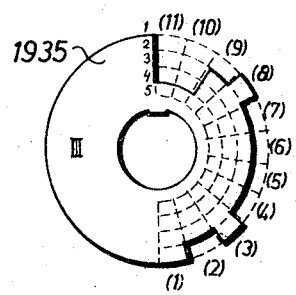

United States Patent Office 3,296,961
Patented Jan. 10, 1967

3,296,961
RECORDING ASSEMBLY FOR ACCOUNTING MACHINE
Gosta R. Englund, Stockholm, and Mats E. Mattsson, Sollentuna, Sweden, assignors to Svenska Dataregister AB, Stockholm, Sweden, a corporation of Sweden
Original application Mar. 14, 1962, Ser. No. 179,595. Divided and this application Sept. 22, 1965, Ser. No. 489,300
Claims priority, application Sweden, Mar. 17, 1961, 2,839/61
22 Claims. (Cl. 101—93)

This invention relates to an accounting machine and, more particularly, to new and improved recording means for a cash register. This application is a division of pending application Ser. No. 179,595, filed Mar. 14, 1962.

In recent years, it has become desirable in most businesses, especially in retail merchandising establishments, to collect a considerable volume of data relating to the sale of goods or services in order to provide a more accurate evaluation of a business. Although this can be done in a number of ways, the desired information often is most easily acquired at the point-of-sale in retail stores. Since the cash register is frequently the only accounting machine in use at the point-of-sale, a considerable amount of information can be collected and stored by increasing the data accumulating capacity of the cash register, and this data can be made more useful by automatically programming the cash register to handle and record the input data in a manner suited to the accounting practices of the store. However, because of the different quantities, types and forms in which data is used in different businesses, the cash register should provide programming means and data collecting, storing, and recording means that are quite flexible to permit a basic cash register construction to be used in widely varying applications.

Accordingly, one object of the present invention is to provide a new and improved accounting machine.

Another object is to provide a cash register including new and improved means for storing and recording data.

Another object is to provide an accounting machine including a recording means having a new and improved programming or control means.

A further object is to provide an accounting machine including control means for automatically selecting different data recording programs or formats in accordance with the different types of operations performed by the accounting machine.

Another object is to provide a receipt or ticket printing assembly for a cash register including new and improved means for severing a length of a record strip to form the receipt or ticket.

Another object is to provide an accounting machine including different output recording assemblies that are so arranged as to conjointly provide a continuously visible display of all of the entries in any given transaction or series of operations of the accounting machine.

Another object is to provide a printing assembly for an accounting machine including separate printing means and control means for selectively rendering different ones or combinations of the printing means effective to produce different types of records in accordance with the different types of operations performed by the accounting machine.

Many other objects and advantages of the present invention will become apparent from considering the following detailed description in conjunction with the drawings in which:

FIGURE 1 is a perspective view of a cash register embodying the present invention;

FIGURES 2A and 2B form a side sectional view of the cash register with the housing removed;

FIGURES 3A and 3B form a rear elevational view of the cash register with the housing removed;

FIGURE 4 is a top view of the keys in a keyboard assembly for the cash register;

FIGURES 5A and 5B, when placed side-by-side, form a schematic illustration of an indicating assembly in the cash register;

FIGURE 6 is a side elevational view of a printing assembly included in the cash register shown with the cover and certain supporting elements removed;

FIGURE 7 is a sectional view of the printing assembly viewed from the opposite side from FIGURE 6 with a supporting wall removed;

FIGURE 9 is a perspective view of a total-after-listing consecutive numbering mechanism included in the printing assembly;

FIGURE 10 is a perspective view of a control mechanism for driving the consecutive numbering mechanism shown in FIGURE 9;

FIGURE 11 is a perspective view of a date and consecutive numbering mechanism included in the printing assembly;

FIGURE 12 is a perspective view of a mechanism for controlling the date and consecutive numbering assembly shown in FIGURE 11;

FIGURE 16 is a detail view of the normal position of a mechanism for operating an audit strip printing assembly included in the printing assembly;

FIGURE 17 is a view similar to FIGURE 16 showing the audit strip printing assembly in an operated position;

FIGURE 18 is an enlarged elevational view of the normal position of a hammer construction included in the audit strip printing assembly;

FIGURE 19 is a view similar to FIGURE 18 showing the hammer means in an operated position;

FIGURE 20 is a perspective view of a mechanism for controlling the operation of the audit strip printing assembly;

FIGURE 22 is a detail view of a hammer means included in the receipt printing assembly shown in a released position during a cycle of operation of the cash register;

FIGURE 23 is a view similar to FIGURE 22 showing the hammer means prior to its operation during a cycle of operation of the cash register;

Figure 24:
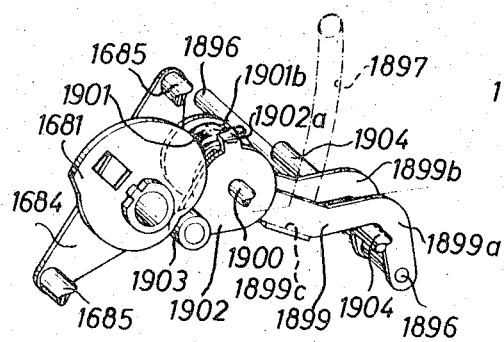
Figure 15:
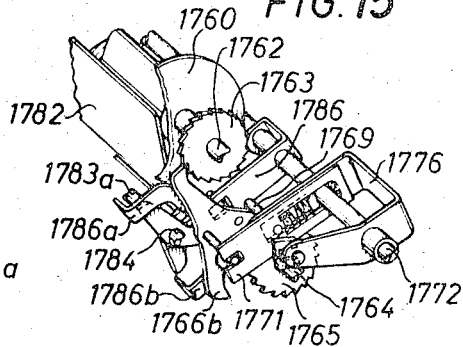
FIGURE 15 is another perspective view of the ribbon drive mechanism shown in FIGURE 13.
Figure 14:
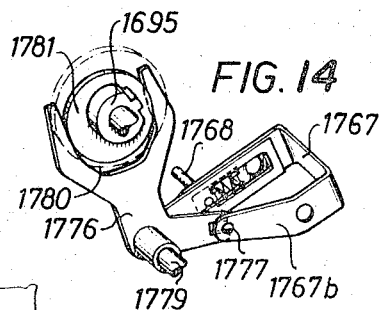
FIGURE 14 is a perspective view of a driving means for the ribbon drive mechanism.
Figure 32:
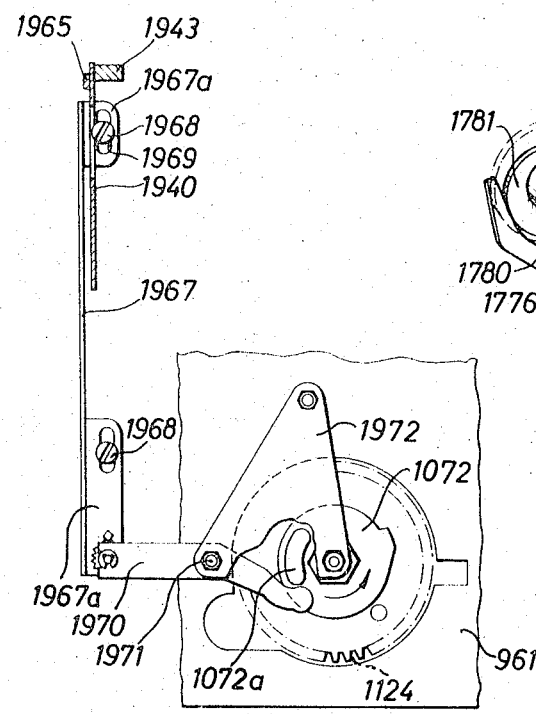
Figure 33:
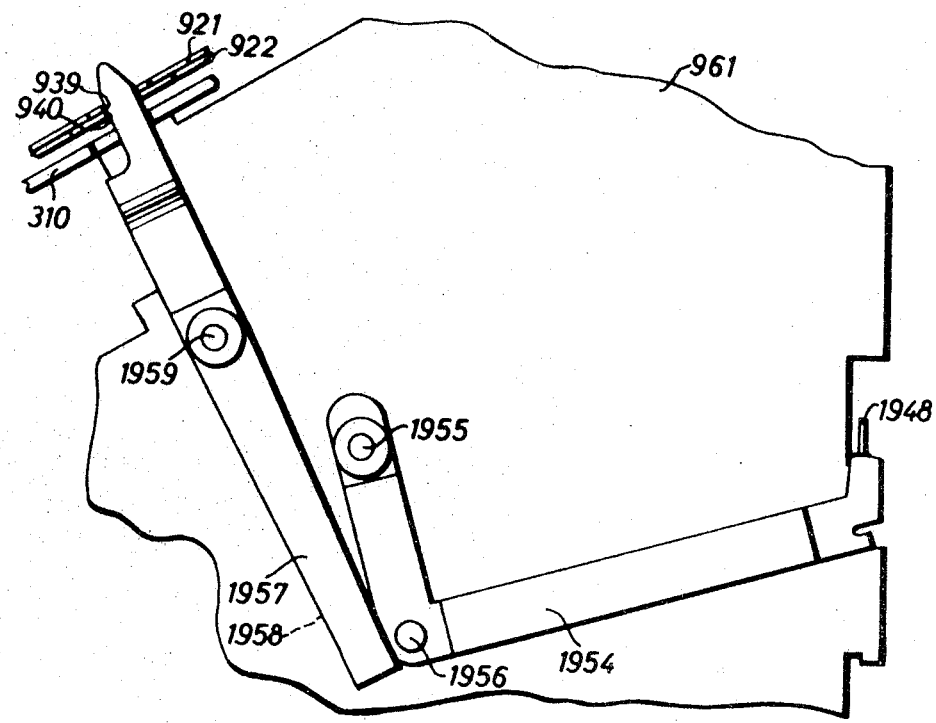
Figure 40:
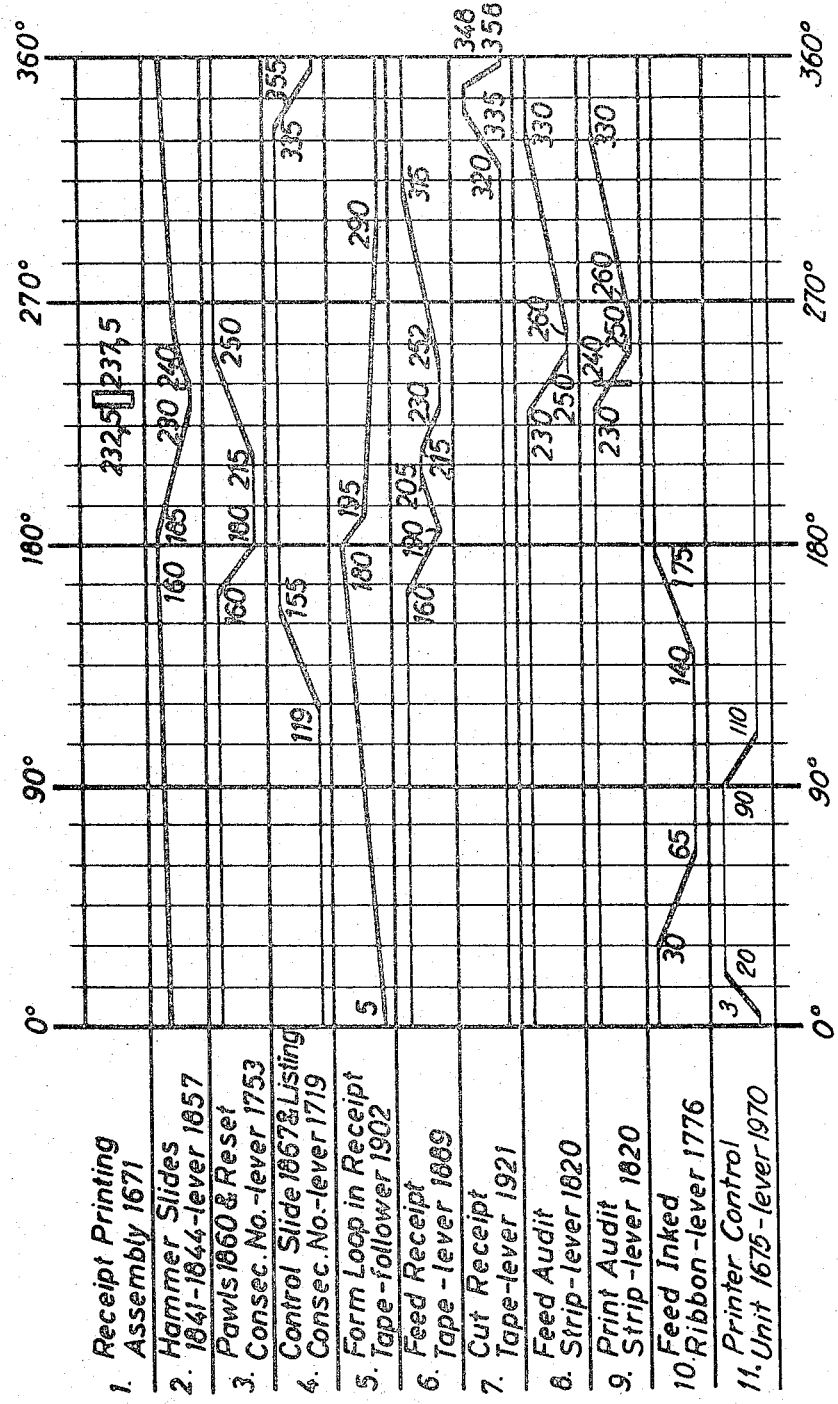

FIGURE 24, appearing on the same sheet as FIGURE 14, is a perspective view of a mechanism included in the receipt printing assembly for producing a loop of slack paper tape;

FIGURE 25 is a detail view of a mechanism for controlling the operation of tape feeding means and tape severing means included in the receipt printing assembly, the mechanism being shown in normal position;

FIGURE 26 is a view similar to FIGURE 25 showing the control mechanism in an operated condition;

FIGURE 27 is a perspective view of a drive mechanism for operating the tape severing means included in the receipt printing assembly;

FIGURE 28 is a detail view taken from the back of the cash register illustrating a unit for controlling the operation of the printing assembly;

FIGURE 29 is an enlarged sectional view taken along line 29—29 in FIGURE 28;

FIGURE 30 is an enlarged plan view of a portion of the control mechanism shown in FIGURE 28;

FIGURE 31, appearing on the same sheet as FIGURES 9–12, is a perspective view of another portion of the control unit for the printing assembly;

FIGURE 32, appearing on the same sheet as FIGURE 14, is a detail view of an operating mechanism for the control unit in the printing assembly;

FIGURE 33 is a detail view of a means for controlling the effectiveness of the printing assembly to produce receipts;

FIGURE 34 is a schematic plan view of a control slide for controlling the operation of the receipt printing assembly;

FIGURE 35 is a schematic plan view of a control member included in the printer control unit;

FIGURE 36 is a schematic plan view of a control yoke used to control the operation of the tape feeding and severing means in the receipt printing unit;

FIGURE 37 is a plan view of a coded member for controlling a consecutive number counter;

FIGURES 38 and 39 are schematic plan views of two control members included in the printer control unit in the printing assembly; and FIGURE 40 is a timing diagram illustrating the various times during a cycle of operation of the cash register at which different components and mechanisms therein are operated.

GENERAL DESCRIPTION

Figure 1:
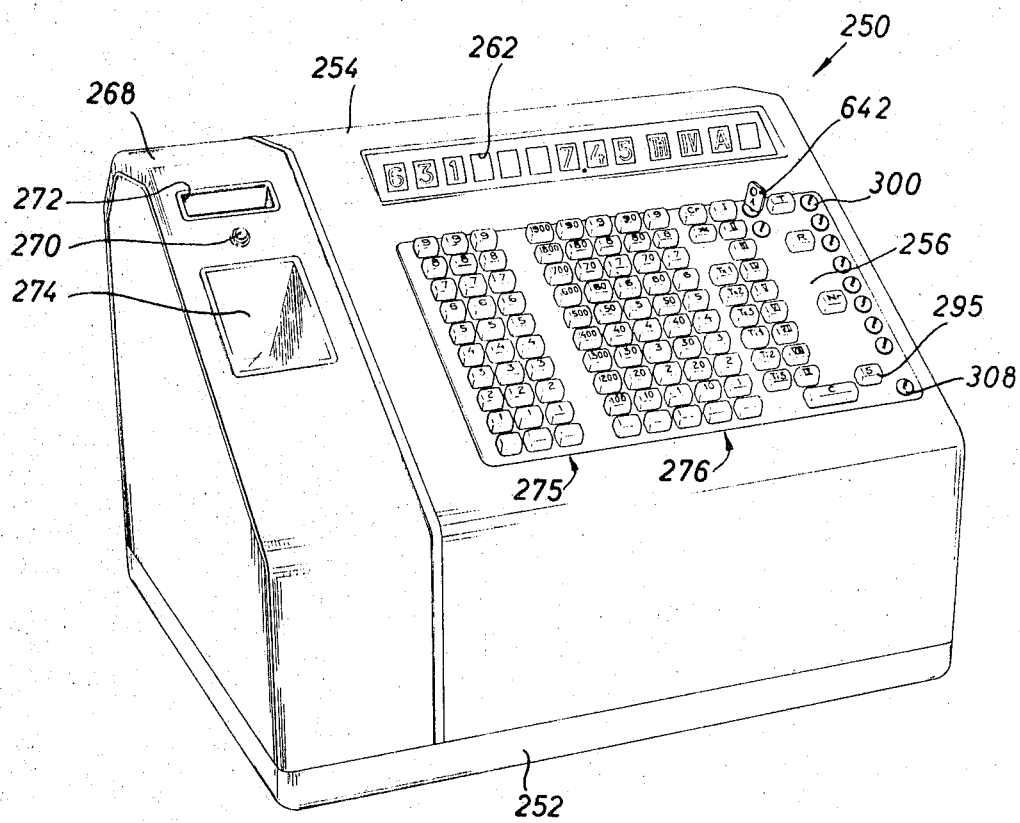

Referring now more specifically to FIGURE 1 of the drawings, therein is shown a cash register which is indicated generally as 250 and which embodies the present invention. The cash register 250 includes novel means for entering and storing, recovering and recording data; for performing arithmetical operations thereon; and for programming the various data handling operations to be performed. Although the cash register 250 can be provided in different forms for use in many different types of commercial establishments, the novel cash register illustrated and described in detail below is adapted for use in cooperative retail sale outlets in which a customer identification or number must be recorded in conjunction with each sales transaction. In addition, since the cash register 250 is designed for use in retail installations in which various local, state and federal taxes may be applicable, the cash register includes means for diverting entered taxable items on which different taxes are due into separate storage means in the cash register and for automatically recovering this information from storage during a totalizing operation to permit the applicable tax amounts to be entered.

Figure 2A:
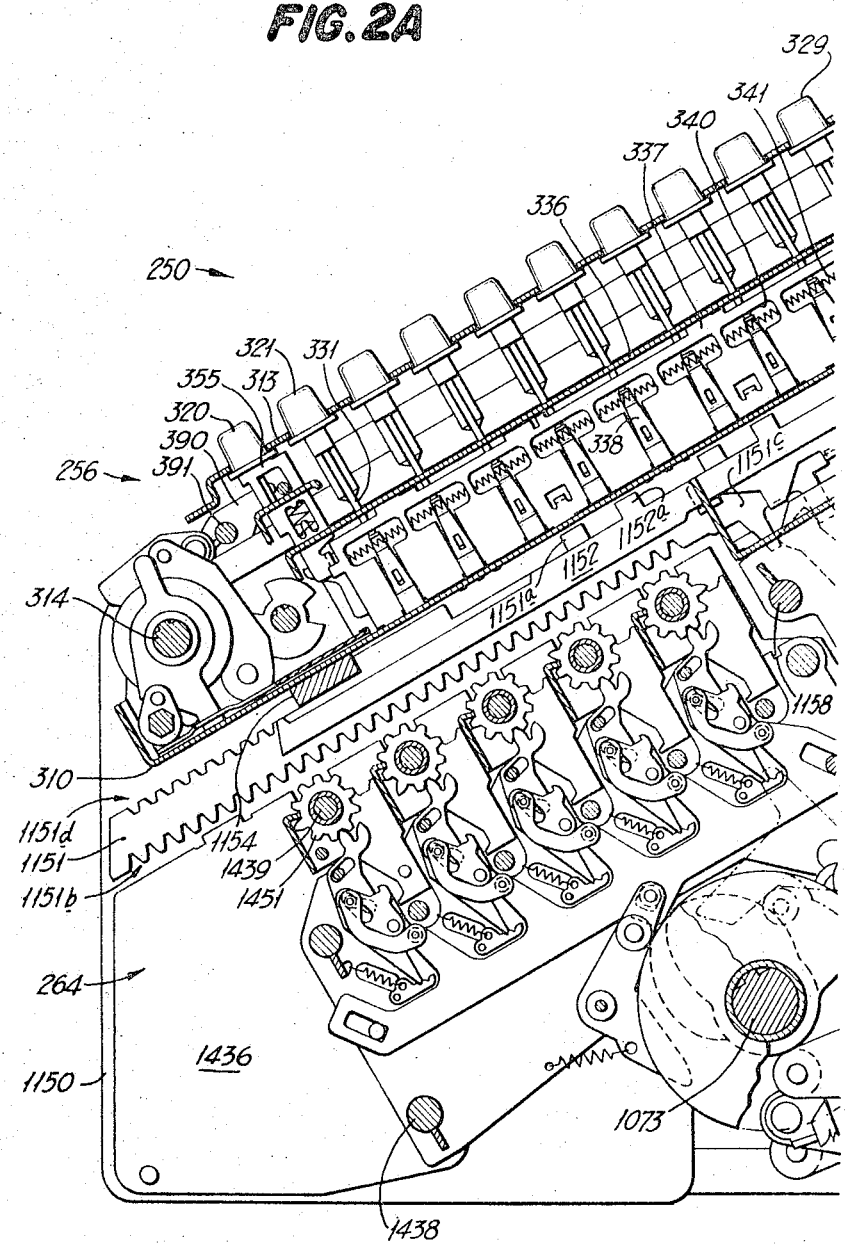
Figure 2B:
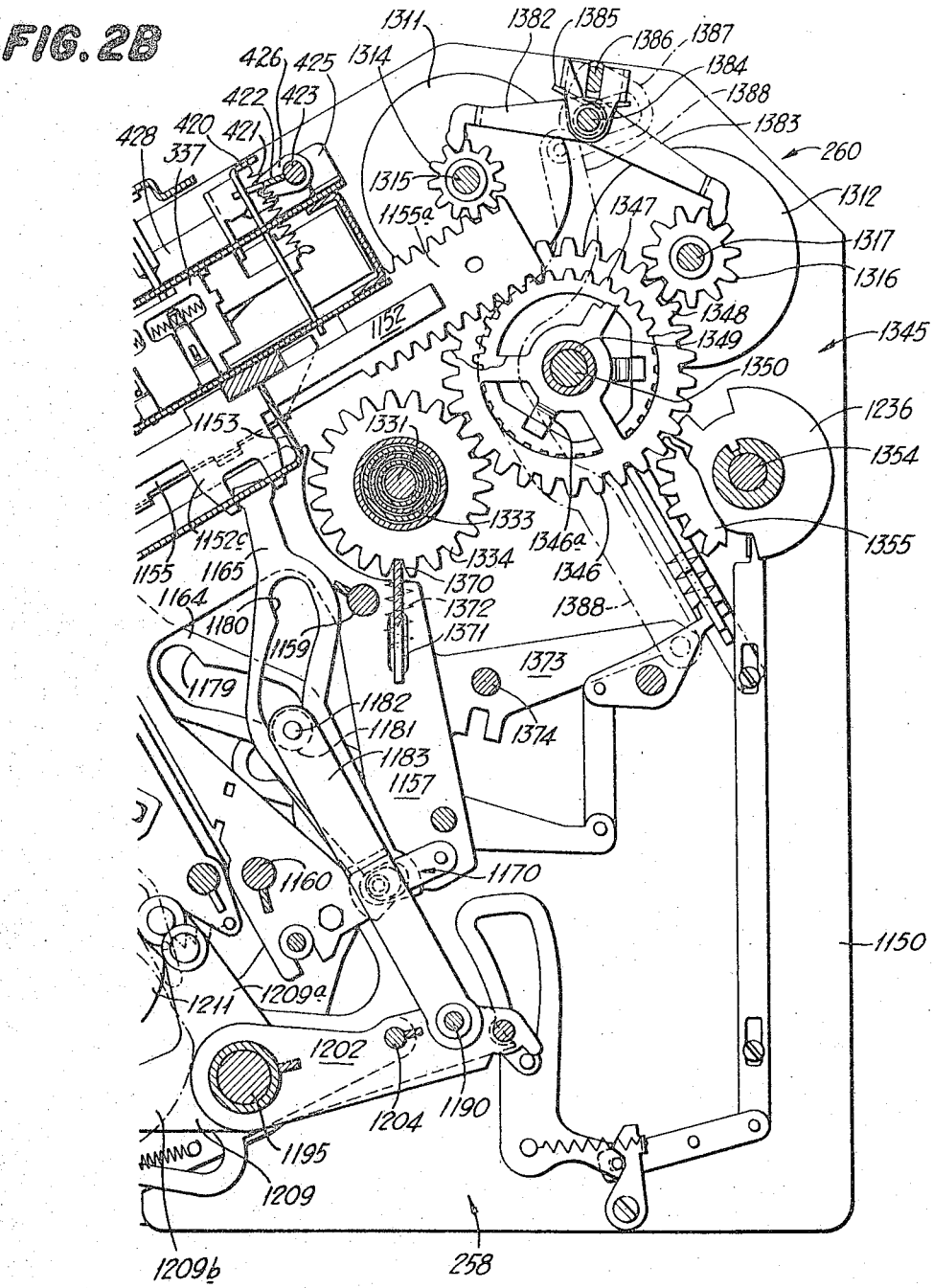

In general, the cash register 250 includes a base 252 for supporting the cash register construction on which a main housing 254 enclosing the main portion of the cash register construction is removably mounted. Although the cash register 250 is not shown as including cash drawers, one or more cash drawers can be provided in place of the base 252. The portion of the cash register construction enclosed by the housing 254 includes a unitary keyboard assembly, indicated generally as 256 (FIGURES 1 and 2), by which control and digital data is manually entered into the cash register 250. The keyboard assembly 256 includes various memory means by which this assembly can be manually operated to enter data in a given order into the cash register 250 by controlling the setting of a plurality of differential assemblies indicated generally as 258 (FIGURES 2 and 3). The selective adjustment of the plurality of differential rack assemblies 258 controls the setting of an indicating assembly, indicated generally as 260 (FIGURES 2 and 3), that provides a visible display of various items of information through a plurality of windows 262 provided in the front and back of the housing 254. The keyboard assembly 256, including the memory means provided therein, also controls the selective transfer of information between the differential rack assemblies 258 and an accumulator or totalizer assembly indicated generally as 264 (FIGURE 2).

The cash register 250 also includes a printing or recording assembly, indicated generally as 266 (FIG. 3), that is selectively supplied with different items of information under the control of the differential assemblies 258 to provide different types of printed records. The printing assembly 266 is disposed within a housing or cover 268 (FIG. 1) which is mounted on the base 252 and which is detachably secured to the main housing 254 by a latching means including a manually operable element 270. The printing assembly 266 provides receipts severed from a length of paper tape that are discharged through an opening 272 in the housing 268 and a continuous audit tape or strip that is visible through a window 274 in the housing 268.

The cash register 250 also includes a start test assembly, indicated generally as 267 (FIG. 3A), that is effective to permit an operation of the cash register 250 to be initiated only when the actuated keys represent data that conforms to the program of the cash register. The start test means 267 is placed in operation by the actuation of a selected group of keys in the assembly 256 that possess the start function and operates upon actuation of one of these keys to sense the type of data entry supplied by the keyboard assembly 256. If the type of entry conforms to the program, the cash register 250 is permitted to operate. Alternatively, if the data conditionally entered into the keyboard 256 is not permitted by the program, the attempted start of the cash register 250 is blocked.

The details of the keyboard assembly 256, the differential assemblies 258, the indicating assembly 260, and the accumulator assembly 264 are shown and described in the copending application.

KEYBOARD ASSEMBLY 256

The keyboard assembly 256 controls and coordinates all of the operations of the cash register 250 and provides means for manually entering digital and control data into the register. In addition, the assembly 256 includes various memory means which permit the operation of only selected key combinations at different points in a transaction, which control the start test means 267 to permit the cash register 250 to be placed in operation only when correct data it sought to be manually entered, and which control the automatic recovery of certain items of information, such as taxable items, from the accumulator or totalizer assembly 264.

Figure 4:
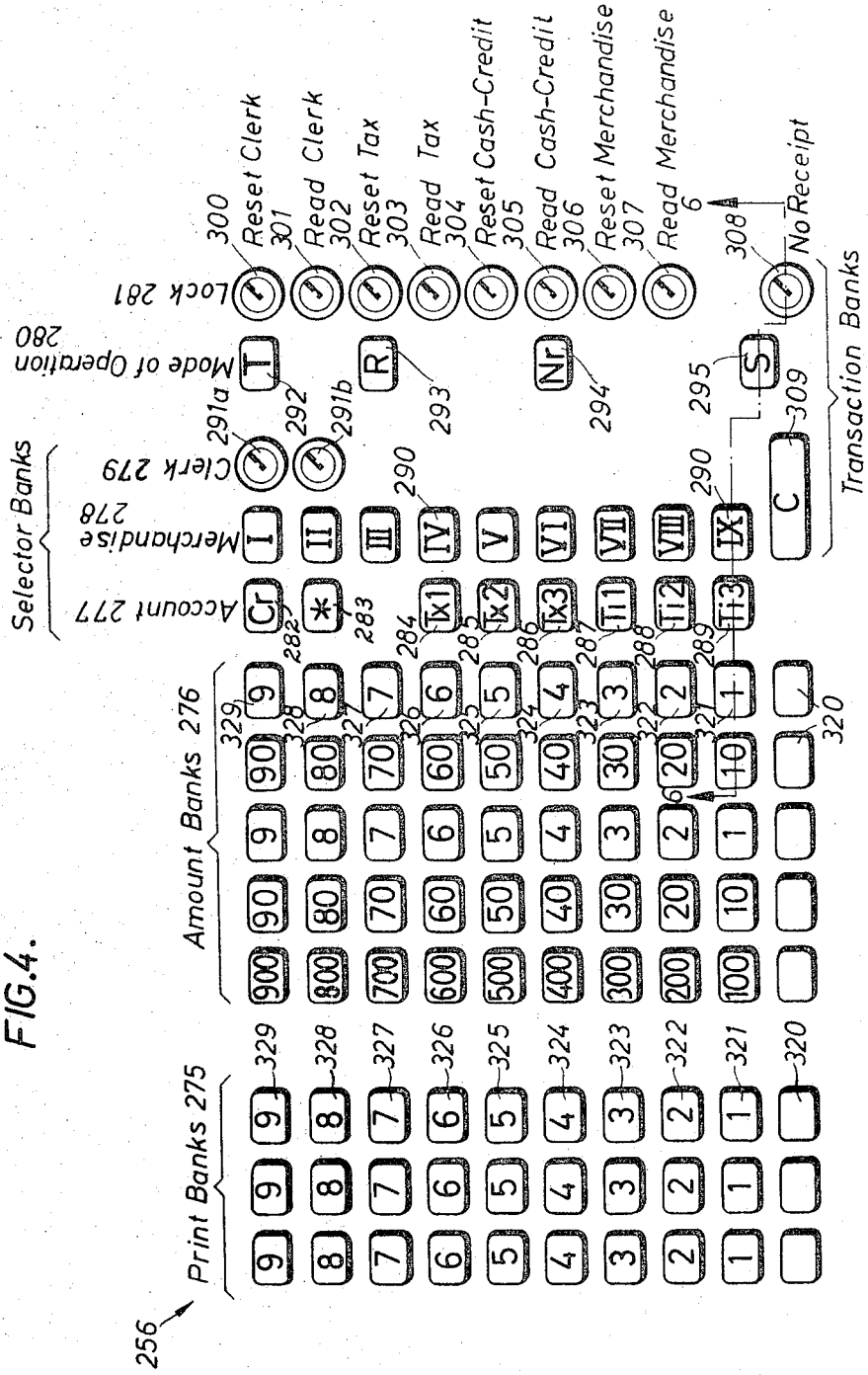

The keyboard assembly 256 (FIG. 4) includes three banks 275 of print keys that are used to enter digital data that is indicated or recorded but is not totalized, such as a numerical designation identifying a sales article. The keyboard assembly 256 also includes five amount key banks 276 that are used to enter digital data, such as amounts or customer numbers, into the cash register 250. Although the amount banks 276 are shown as comprising five banks for entering a five digit number, the accumulating assembly 264 is capable of storing a nine digit number. Thus, the number of amount banks 276 can be expanded, if desirable. Each of the banks 275 and 276 controls a related differential assembly 258.

The keyboard assembly 256 also includes a plurality of transaction banks that are used to enter control information into the cash register 250. The transaction banks includes an account bank 277, a merchandise bank 278, and a clerk bank 279, which functions as selector banks, a mode of operation bank 280, and a lock bank 281. All of the banks 277–281 except the bank 281 control a selected differential assembly 258. The selector banks 277, 278 and 279 perform the primary function of determining the ones of the totalizers or accumulators in the assembly 264 to which data is directed and from which data is withdrawn. The mode of operation bank 280 selects the type of operation to be performed by the cash register 250, and the lock bank 281 provides means for reading and resetting the accumulators in the assembly 264.

Referring now more specifically to the selector banks, the account bank 277 is effectively or functionally divided into two separate banks, a first of which includes two keys 282 and 283. The credit or charge key 282 is actuated to terminate a series of listing operations in a credit total, and the cash key 283 performs the same function for a cash transaction. The second group or bank in the account bank 277 includes six keys, 284–289, that are used with taxable items. The taxable item keys 287–289 are selectively operated during listing operations to direct amounts on which three different taxes, such as local, state, and federal taxes, are applicable to three separate accumulators in the assembly 264. The tax amount keys 284–286 are used to enter three different tax amounts due into three different accumulators in the assembly 264. The account bank 277 also includes a number of automatically operated keys that are selectively actuated under the control of a memory means during a total operation.

The merchandise bank 278 includes nine keys 290. The lower seven keys "III–IX" (FIGS. 1 and 4) are selectively actuated during data entering operations to direct amounts supplied by the banks 276 to different ones of the accumulators in the assembly 264 in accordance with any desired classification, such as type of merchandise, i.e., groceries, meat, produce, etc. The uppermost two keys "I" and "II" provide refund keys for the adjacent keys in the clerk bank 279. The cash register 250 is controlled to provide a first type of repeated identical entry by manually holding a key in the bank 278 depressed.

The clerk bank 279 includes two lock-type keys 291 which are selectively operated to direct amounts entered by the keys in the amount banks 276 into accumulators in the assembly 264 representing two different clerks. The operation of one of these keys also frees the keyboard assembly for operation by releasing a keyboard lock.

The mode of operation bank 280 includes four manually operable keys 292–295 and additional automatically operable keys that are used to control the setting of the mode of operation differential assembly 258 to select the type or mode of operation to be performed by the cash register 250. The key 292 provides manually actuated means for initiating a total operation of the register 250, and the key 295 provides means for manually initiating a subtotal operation. The key 294 is operated when a customer designation or number is to be registered, and the key 293 is actuated when a second type of repeat operation of the cash register 250 is desired. During this second type of repeat operation, a data item previously entered can be repeatedly entered by locking the indicating assembly 260.

The lock bank 281 includes nine lock keys 300–308. The keys 300 and 301 are used for resetting and reading the clerk accumulators in the assembly 264, respectively, and the keys 302 and 303 are used for resetting and reading the tax accumulators in the assembly 264, respectively. The keys 304 and 305 are used for resetting and reading the cash-credit accumulators in the assembly 264, respectively, and the keys 306 and 307 are used to reset and read the merchandise accumulators in the assembly 264, respectively. The key 308 is actuated when the printing assembly 266 is to issue a receipt during a total operation.

The keyboard assembly 256 also includes a key 309 that is actuated when a motor driven correction of the keyboard assembly 256 is required. The actuation of the key 309 renders a drive motor in the cash register 250 effective to restore or release the actuated keys in the assembly 256.

The keyboard assembly 256 comprises a unitary and separately operable structure that is mounted on the supporting frame for the cash register 250 (FIG. 2) and includes a base or lower plate or wall 310 to which a pair of side walls are secured. An apertured top plate 313 through which the plurality of keys extends is secured to the flanged upper edges of the side walls. The keyboard assembly 256 is provided with a separate drive shaft 314 that is driven by and in synchronism with the main shaft of the cash register 250. The drive shaft 314 is rotatably mounted at its opposite ends in the side walls and is connected to a gear that meshes with suitable drive means carried on the main frame of the cash register.

The print banks 275 and the amount banks 276, which control the setting of related print and amount differential assemblies 258, are identical and each include a manual correction key 320 and nine keys 321–329 representing the digits "1–9," respectively. Each of the keys 321–329 includes a plastic head portion projecting upwardly through an opening in the cover plate 313. The head portion of each of the keys 321–329 includes a transversely extending slot or opening in which the upper end of a key shaft or stem 331 is slidably mounted. The upper end of each of the key stems 331 is provided with an opening for receiving a compression spring on which the head portion of each of the keys 321–329 rests to provide a yielding or resilient connection between the head portions of each of these keys and the key stems 331.

The stems 331 are slidably mounted in transversely extending slots in the plate 310 at their lower ends and are slidably mounted in similar slots in a frame member 336 that is carried on the frame of the keyboard assembly 256. The lower ends of the key stems 331 are disposed above one of the differential assemblies 258 (FIG. 2) in the main body of the cash register 250 so that when a given one of the keys 321–329 is depressed, the related key stem 331 moves downwardly to place its lower end in the path of movement of two differential elements in the assembly 258. This provides means for arresting movement of the differential assembly 258 in a position corresponding to the value represented by the depressed key.

To provide means for retaining the keys 321–329 in a depressed position, a latch supporting plate 337 is mounted adjacent the key stems 331 in each of the banks 275 and 276. The plate 337 includes spaced projections along its upper and lower edges that are received within corresponding openings in the base plate 310 and the plate 336. A plurality of detent elements 338 having U-shaped lower ends interposed between the upper surface of the base plate 310 and positioning notches formed in the lower edge of the plate 337 include angularly formed upper end portions that extend through openings 340 in the plate 337. An elongated compression spring 341 secured at its opposite ends to a pair of lugs on the plate 337 is positioned within the offset end portions to resiliently bias the detent elements 338 toward the adjacent edges of the key stems 331. When one of the stems 331 is depressed, a projection on the stem cams against the end portion on the element 338 to move the adjacent element 338 to permit the key stem 331 to move downwardly. When the projection passes beyond the end portion, the spring 341 displaces the detent 338 to hold the operated key in a depressed condition.

The keys 321–329 in the banks 275 and 276 are flexible so that the depression of one of these keys prior to the initiation of a cycle of operation of the cash register 250 and following the actuation of another key in the same bank results in the release of the previously depressed key. To accomplish this, the keys in each of the banks 275 and 276 are linked by coupling elements (not shown) providing a flexible key coupling assembly of the type shown in the copending application.

An operated or depressed one of the keys 321–329 in the banks 275 and 276 can also be restored to a normal condition by manually actuating the related correction key 320. The correction key 320 includes a correction key stem 355 (FIG. 2A) that is slidably mounted in the frame 336 at its lower end and includes a projection at its upper end that is received within a slot in the lower end of the button or head of the key 320. Depression of the key 320 controls the related coupling assembly to restore any depressed key in the associated bank to its normal condition. To provide motor driven key restoring operations, an arm 390 secured to a shaft 391 overlies a lug on the key stem 355. The keyboard drive means pivots the shaft 391 in a clockwise direction to depress the stem 355 and restore any operated keys to their normal position.

Each of the print banks 275 and the amount banks 276 in the keyboard assembly 256 includes a zero stop means that is effective during certain modes of operation of the cash register 250 to arrest the differential assemblies 258 in a zero position when the keys in the associated banks 275 and 276 have not been operated. In general, the zero stop means comprises a stop element or automatically actuated key stem that is normally retained in an ineffective position. This stop element is freed for movement to a depressed or effective position at the beginning of a cycle of operation of the cash register, and this detent element tests whether or not a key in the bank has been actuated. If no keys have been actuated, the stop element moves to a depressed position in which it is effective to prevent movement of the related differential assembly 258. Alternatively, if a value representing key has been actuated, the zero stop key stem is retained in an ineffective position.

At this point in the cycle of operation of the cash register 250, a detecting means tests to determine whether the mode of operation being performed is one in which the differential assemblies 258 associated with the banks 275 and 276 are to be set under the control of the keyboard assembly 256 or are to be set under the control of other means, such as the accumulator assembly 264. If the differential assemblies 258 are to be set under the control of the keyboard assembly 256, the zero stop key stems remain in their effective or ineffective positions in accordance with the selective actuation of the keys in related banks 275 and 276. Alternatively, if the selected mode of operation requires the differential assemblies 258 to be set under the control of the accumulator assembly 264, for instance, the zero stop control means automatically restores all of the zero stop elements to an ineffective position prior to the actuation of the differential assemblies 258.

The zero stop means in each of the print banks 275 and the amount banks 276 includes a zero stop detent element or key stem 420 that is slidably mounted in the frame elements 336 and 310. The key stem 420 also includes an offset portion that is slidably mounted in the frame element 336 to be disposed above an arm on the coupling link associated with the key 329. A tension spring 421 connected between a projecting portion on the keyboard frame and an offset portion at the upper end of the key stem 420 provides means resiliently biasing the zero stop key stem 420 downwardly.

To provide means for selectively rendering the key stem 420 effective and ineffective, a plate 422 secured to a shaft 423 is provided with a plurality of projecting lugs which are received within openings formed in the upper ends of the key stems 420. The shaft 423 is pivotally mounted on the frame element 336 by a pair of brackets 425 and is secured at one end to an arm 426 carrying a cam follower roller (not shown). The tension springs 421 act on the key stems 420, the plate 422, and the shaft 423 to bias the cam follower roller into engagement with the upper surface of a control slide 428 that is slidably connected to one side wall of the keyboard frame.

The upper edge of the slide 428 includes a lower surface and an upper surface. In the position of the slide 428 when the cash register 250 is in a normal condition between cycles of operation, the cam follower roller engages the upper surface on the slide so that the plurality of zero stop elements 420 are secured in an elevated position (FIG. 2) against the action of the plurality of tension springs 421. When the slide 428 is shifted to the right, the cam follower roller engages the lower surface, and the shaft 423 is pivoted in a counterclockwise direction so that the lugs on the plate 422 are lowered within the openings in the key stems 420.

If one of the keys 321–329 in the bank associated with a particular zero stop element 420 has been actuated, the arm on the end coupling link engages the offset portion on the stem 420 and prevents the zero stop element 420 from moving downwardly under the influence of the tension spring 421. Alternatively, if one of the keys in the associated bank has not been operated so that the coupling link associated with the last key 329 in the bank remains in its normal position, the tension spring 421 lowers the associated zero stop stem 420 to a position in which it prevents movement or operation of the associated differential assembly 258.

When the slide 428 is moved to the left to the normal position shown in FIG. 2, the engagement of the cam follower roller with the upper surface pivots the arm 426 and the shaft 423 in a clockwise direction so that the lugs on the plate 422 engage the upper edges of the openings in the key stems 420 to restore these stems against the force of springs 421 to their normal positions. The slide 428 is restored to its normal position before the operation of the differential assemblies 258 in those modes of operation selected by the bank 280 in which the assemblies 258 are not to be set by the keyboard assembly 256. Alternatively, the slide 428 is restored to its normal position shown in FIG. 2 following the setting of the differential assemblies 258 in those modes of operation in which the assemblies 258 are to be set under the control of the keyboard assembly 256. Suitable means for controlling the shifting movement of the slide 428 are shown and described in detail in the copending application.

The selector or transaction banks and the mode of operation bank of the keyboard assembly 256 also include key stems manually or automatically operated to depressed positions in which they are effective to control the setting of the related transaction or mode of operation differential assembly 258. The details of these constructions as well as the manner of operation thereof are set forth in the copending application. This copending application also illustrates and describes further details of the print and amount banks of the keyboard assembly 256.

DIFFERENTIAL ASSEMBLIES 258

The cash register 250 includes nine amount differential assemblies 258 (FIGS. 2 and 3) and four transaction differential assemblies 258 which are driven by the main shaft 1073 of the cash register 250 to different settings determined by the actuated keys in the keyboard assembly 256 to control the entry of information into the cash register 250 and to control the performance of various functions thereby. During listing operations, five of the amount differential assemblies 258 are directly controlled by the keys in five amount banks in the keyboard assembly 256 to supply digital data to five orders of the accumulator assembly 264, the printing assembly 266, and the indicating assembly 260, the remaining four higher orders of the accumulator assembly 264 being capable of receiving data from the four lower orders by carry operations. During listing, the keys in three print banks in the assembly 256 directly control the three highest order differential assemblies 258 to supply digital data to only the printing assembly 266 and the indicating assembly 260. During reading or resetting operations, the nine amount differential assemblies 258 are controlled by the accumulator assembly 264 to supply digital information to the printing assembly 266 and the indicating assembly 260. The single transaction or mode of operation differential assembly 258 controlled by the keys in the transaction banks in the assembly 256 conditions the cash register 250 for different types or modes of operation, and the three transaction differential assemblies 258 controlled by the keys in the transaction banks in the assembly 256 select different accumulators in the accumulator assembly 264 as well as provide different auxiliary controls over the operation of the cash register 250.

The differential assemblies 258 included in the cash register 250 are of the positively driven type shown and described in detail in Patent No. 3,040,978. In general, each assembly 258 includes an accumulator slide or rack and a complementary slide or rack that are mounted for oppositely directed translatory movement beneath the keyboard assembly 256. The upper edges of these two racks are provided with spaced projections which engage opposite sides of a depressed key shaft or stem to locate the slides in a position corresponding to the depressed key. In operation, the accumulator slide is moved in one direction to engage one side of a depressed key shaft and the complementary slide is moved in an opposite direction so that one of the projections on this slide engages the opposite side of the depressed key stem to set the complementary slide in a position complementary to the arrested position of the accumulator slide. An indicator slide or rack loosely coupled to the complementary and accumulator slides is set in different positions in accordance with settings of the accumulator and complementary slides and remains in this setting between successive cycles of operation of the cash register 250. Information is transmitted to and removed from the accumulator assembly 264 by selectively moving one or more accumulators into engagement with the toothed portion of the accumulator slide. The differential assemblies 258 are supported on the main frame of the cash register 250 between the right wall 961 (FIG. 3A), considered from the front of the register 250, and a left supporting wall 1150 (FIG. 3B) by suitable supporting shafts and bars to be disposed in an inclined position immediately beneath the keyboard assembly 256.

Each of the differential assemblies 258 controlled by the print and amount banks includes an accumulator slide or rack 1151 and a complementary slide or rack 1152 that are slidably mounted for movement parallel to each other in suitable slots formed in a U-shaped supporting element 1153 that extends between and is secured to the side walls 961 and 1150. The upper edges of the slides 1151 and 1152 are provided with projecting portions 1151a and 1152a that are disposed immediately below the keyboard assembly 256 and are adapted to be moved into engagement with opposite sides of the depressed portion of a key shaft. Projections adjacent the ends of these two slides are adapted to be moved into engagement with two bars 1154 that extend between and are secured to the side walls 961 and 1150 to determine the normal positions of the slides 1151 and 1152 shown in FIGS. 2A and 2B. The left-hand lower edge of the accumulator slide or rack 1151 is provided with a toothed portion 1151b for engaging gears in the accumulator assembly 264. The upper left-hand edge of the rack 1151 includes a toothed portion 1151d that is used when the setting of the assembly 258 is controlled by the accumulator assembly 264.

To provide a means for controlling the setting of the indicator assembly 260 and the printing assembly 266 in dependence on the setting to which the accumulator slide 1151 and the complementary slide 1152 are moved, an indicator slide or rack 1155 is slidably mounted in slots formed in the supporting member 1153 and is disposed between the slides 1151 and 1152. The indicator slide 1155 is loosely coupled to the accumulator slide 1151 and the complementary slide 1152 by suitable projections formed on spaced portions of the slide 1155 that engage shoulders or projections formed on the slides 1151 and 1152. The right end portion of the indicator slide 1155 is provided with toothed portions 1155a along its upper and lower edges for controlling the setting of the indicator assembly 260 and the printing assembly 266.

When the cash register 250 is placed in operation, the accumulator slide 1151 is moved to the right to a position determined by a depressed key shaft or the accumulator assembly 264, and the complementary slide 1152 is moved to the left to a position complementary to that of the accumulator slide 1151. During this movement, the projections on the indicator slide 1155 are engaged by the slides 1151 or 1152 to move the indicator slide 1155 from its previous position to a position corresponding to the present setting of the slides 1151 and 1152. When the differential assembly 258 is restored to its normal position, the complementary slide 1152 is moved to the right to a normal position and the accumulator slide 1151 is moved to the left to a normal position. The indicator slide 1155 remains in the adjusting setting inasmuch as the two slides 1151 and 1152 move away from engagement with the projections on the indicator slide 1155. Thus, when the differential assembly is actuated to its next setting, the indicator slide 1155 is only moved from its previous setting to the next setting and is not returned to a zero position and operated to a new setting during each cycle of operation of the cash register 250.

The transaction differential assemblies 258 controlled by the selector banks in the assembly 256 are substantially identical to the differential assembly 258 controlled by the keys in the print banks and the amount banks in including an accumulator rack 1151, a complementary rack or slide 1152, and an indicator rack or slide 1155 slidably mounted in slots on the supporting element 1153. However, the lower left-hand edge of the accumulator slides 1151 are not provided with the toothed portion 1151b because the differential assemblies 258 in the selector banks are not used to transfer digital information to or receive digital information from the accumulator assembly 264. In addition, the indicator slides 1155 in the assemblies 258 controlled by the selector banks can include coupling means for coupling the indicator racks 1155 to corresponding selecting means in the accumulator assembly 264.

The single differential assembly 258 controlled by the keys in the mode of operation bank in the keyboard assembly 256 is substantially identical to the remaining differential assemblies in including an accumulator rack 1151, a complementary slide or rack 1152, and an indicator slide or rack 1155 that are slidably mounted for parallel movement relative to each other within openings or slots formed in the supporting member 1153. The slides 1151 and 1152 include projections 1151a and 1152a at spaced portions along their upper edges which cooperate with depressed key shafts in the mode of operation bank to set the slides 1151 and 1152 in eleven different complementary positions corresponding to the eleven modes of operation provided in the illustrated cash register 250.

However, since the mode of operation bank does not control the entry of digital information into the accumulator assembly 264, the left-hand lower edge of the accumulator rack 1151 does not include the toothed portion 1151b. In addition, the left end of the indicator slide 1155 is coupled to means for driving or actuating a plurality of different control assemblies in the cash register 250 controlled by the setting of the mode of operation differential assembly 258.

Each pair of accumulator slides 1151 and complementary slides 1152 is actuated by an individual differential actuator which moves the slides in opposite directions to complementary positions during a setting operation and which moves these slides in opposite directions to their normal positions at the conclusion of the setting operation. The differential actuators are operated by the main shaft 1073 of the cash register 250 in a timed sequence so that the differential assemblies 258 controlled by the transaction banks of the keyboard assembly 256 are set prior to the concurrent setting of the differential assemblies controlled by the keys in the print and amount banks.

The differential actuators used to drive the racks or slides 1151 and 1152 are substantially the same as those disclosed in the identified patent and are mounted on a plurality of apertured supporting plates 1157 (FIGS. 2 and 3) which are supported in spaced positions beneath each pair of slides 1151 and 1152 by a plurality of rods or shafts 1158, 1159 and 1160 which are secured to the side walls of the frame. The rods 1158–1160 pass through aligned openings in the plates 1157 and cooperate with spacer bars that maintain these plates in the desired spaced relationship. The upper end of each of the plates 1157 is received within openings formed in and is secured to the bight portion of the U-shaped support 1153.

To provide means for actuating the slides 1151 and 1152, each of these slides is provided with a depending portion 1151c and 1152c which is received within a suitably formed slot in the bight portion of the support 1153 and which defines a downwardly open recess or notch. The upper end of a differential lever 1164 disposed on one side of the plate 1157 exends through an opening in the lower wall of the support 1153 to be received within the notch formed in the depending portion 1151c on the accumulator slide 1151, and the upper end of another differential lever 1165 disposed on the other side of the plate 1157 extends through an opening in the wall of the support 1153 to be received within the notch formed in the depending portion 1152c on the complementary rack or slide 1152.

The lower ends of the levers 1164 and 1165 are pivotally mounted on the plate 1157 by an assembly 1170.

To provide means for pivoting the differential levers 1164 and 1165 in opposite directions to produce oppositely directed complementary movements of the slides 1151 and 1152, the levers 1164 and 1165 are provided with a pair of inclined cam slots 1179 and 1180, respectively. A pair of rollers 1181 carried on a shaft 1182 are disposed within the slots 1179 and 1180 and are positioned in the lower ends of these slots in the normal position of the differential actuator assembly 258. The ends of the shaft 1182 are carried on the upper ends of a pair of links 1183. When the links 1183 are moved upwardly, the rollers 1181 engage the walls of the slots 1179 and 1180 to pivot the lever 1179 in a clockwise direction and the lever 1165 in a counterclockwise direction. This moves the accumulator rack 1151 to the right and the complementary slide 1152 to the left. Similarly, when the links 1183 are moved downwardly, the lever 1164 moves in a counterclockwise direction and the lever 1165 moves in a clockwise direction to restore the racks or slides 1151 and 1152 to their normal positions.

The links 1183 for actuating the differential levers 1164 and 1165 in the differential assemblies 258 are raised and lowered at selected times during each cycle of operation of the cash register 250 by cam means driven by the main shaft 1073 of the cash register 250. The four pairs of links 1183 connected to the differential levers 1164 and 1165 in the four differential assemblies 258 controlled by the transaction banks of the keyboard assembly 256 are elevated between 20° and 93° of rotation of the main shaft 1073 and are lowered between 211° and 255° of rotation. The pairs of links 1183 for the amount and print differential assemblies are elevated between 118° and 191° of rotation of the main shaft 1073 and are lowered between 211° and 255° of rotation.

The lower ends of the links 1183 for the amount differential assemblies 258 are pivotally mounted on one or more shafts or rods 1190 which are carried on a group of spaced arms 1202. The arms 1202 are pivotally mounted on a shaft 1195 and are held in spaced parallel relation by a shaft 1204 and a cooperating notched plate or bar. To provide means for pivoting the arms 1202, a cam follower lever 1209 (FIG. 2) is pivotally mounted on the shaft 1195 and is secured at one end to the shaft 1204. One arm 1209a of the lever 1209 carries a roller that is adapted to engage the outer periphery of a cam 1211 that is keyed to the main shaft 1073. A lower arm 1209b of the lever 1209 carries a roller that is adapted to engage the outer periphery of another cam that is keyed to the main shaft 1073 When the main shaft 1073 is rotated in a clockwise direction, the cams pivot the arms 1202 in a counterclockwise direction about the shaft 1195 to raise the links 1183 in the nine amount differential assemblies 258. At a subsequent portion of the cycle of rotation of the main shaft 1073, the arms 1202 are pivoted in a clockwise direction about the shaft 1195 to restore the slides 1151 and 1152 in the amount differential assemblies 258 to their normal position. A similar arrangement is provided for operating the four transaction differential assemblies 258, but with different timing within the operating cycle of the machine 250.

INDICATING ASSEMBLY 260

The indicating assembly 260 is operated or set under the control of the plurality of differential assemblies 258 and includes a plurality of indicator drums for visibly displaying to the customer and to the operator of the cash register 250 the information entered into or recovered from the machine during the preceding cycle of operation and the type of operation performed by the cash register. The indicating assembly 260 also supplies information to be recorded by the printing assembly 266 and is of such a construction that the information can be displayed or transmitted to the recorder in any desired order and permits the recording assembly 266 to be disposed at either side of the cash register 250.

Figure 5A:
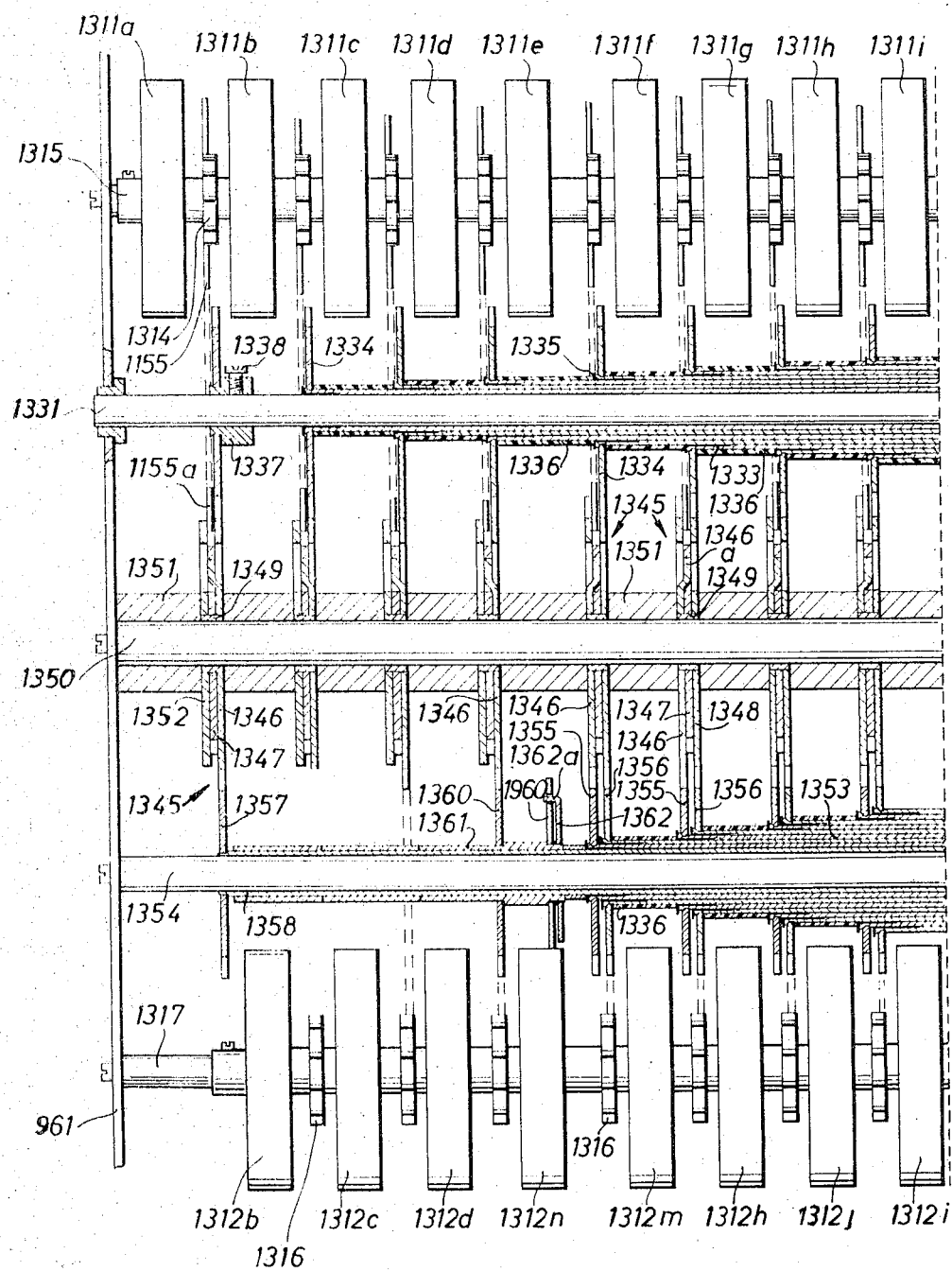

*General construction.*—The indicating assembly 260 (FIGS. 2, 3 and 5) includes thirteen indicator drums 1311a–1311h, 1311m and 1311n visible through the openings 262 at the front of the cash register 250 and twelve indicating drums 1312b–1312h, 1312m and 1312n visible to the customer through suitable opeings or windows 1313 (FIG. 3A) at the back of the cash register 250. The indicator drums 1311 are each secured to a connected gear 1314, and each connected indicator drum 1311 and gear 1314 is rotatably mounted on a shaft 1315 supported between the side walls 961 and 1150. Each of the gears 1314 is engaged by the upper row of teeth on the toothed portion 1155a on one of the indicator racks 1155 so that each of the indicator drums 1311 is set to a position corresponding to the setting of the related differential assembly 258. The indicator drums 1311a–1311d are set by the mode of operation, clerk, merchandise and account differential assemblies 258. The remaining nine indicating drums 1311e–1311h, 1311m and 1311n are set by the nine amount differential assemblies 258.

The outer peripheries of the drums 1311a–1311d are provided with suitable spaced indicia representing the corresponding settings of the related transactions differential assemblies 258. As illustrated in FIGS. 1 and 3, this indicia can comprise indicia corresponding to that impressed on the keys in the related key banks. The drums 1311e–1311g are provided with indicia representing "0" and the digits "1–9." On the remaining indicating drums 1311h–1311k, 1311m and 1311n, the outer surfaces are provided, in sequence, with "0," a blank space, and the digits "1" through "9." This indicia is arranged on the indicating drums 1311 so as to be disposed in alignment with the windows or openings 262 to correspond to the setting of the related differential assembly 258.

Each of the indicator drums 1312b–1312h, 1312m and 1312n is secured to a gear 1316, and each connected gear 1316 and indicator drum 1312 is rotatably mounted on a shaft 1317 that is secured between the walls 961 and 1150. When viewed from the back of the cash register 250, the three left-hand drums 1312b–1312d represent the clerk, merchandise, and account information, respectively. An indicator drum 1312 corresponding to the drum 1311a that supplies mode of operation information is not provided on the rear line of indicator drums. The remaining nine indicator drums 1312, when viewed from left to right in FIGS. 3 and 5, represent amount information considered from the highest order to the lowest order. Thus, the positions of the drums 1311 and 1312 are reversed in order to provide an amount representation that can be read in normal order from left to right in descending denominational order. To facilitate a comparison of the positions of the indicator drums 1311 and 1312, like alphabetical designations have been used on these two sets of drums to indicate drums displaying like digits. The drums 1312e–1312k, 1312m and 1312n are provided with the same indicia as the corresponding drum 1311.

As set forth above, the indicator assembly 260 also supplies information to the printing assembly 266. The printing assembly 266 includes thirteen printing drums or wheels 1318–1330 (FIG. 5) which represent the nine digits of numerical information, the account information, the merchandise information, the clerk information and the mode of operation information, respectively. The mode of operation drum 1330 is secured to a shaft 1331 that is rotatably mounted in the side wall 961 at its left end (FIG. 5) and is rotatably mounted in a frame element at its right end (FIG. 5). The remaining printing drums 1318–1329 are secured to the right ends of a plurality of telescoping shafts or tubes 1333 that are mounted for rotation relative to each other about the axis of the shaft 1331. A gear 1334 is secured to the left end of each of the telescoping shafts 1333. A split nylon bearing 1335 is inserted between each end of the telescoping shafts 1333 and the next adjacent one of the shafts 1333 and is held in position by a split nylon sleeve 1336. Thus, the bearings 1335 can be replaced by removing the sleeve 1336 to permit the removal and insertion of a new bearing 1335 without requiring the telescoping shafts 1333 to be dismounted from the frame of the cash register 250. The axial slot in the bearings 1335 also permits thermal movement or distortion without adversely affecting the movement of the shafts 1333. The gear 1334 for rotating the shaft 1331 is secured to the shaft by a hub 1337 and a set screw 1338.

To provide means for transferring the settings of the indicator racks or slides 1155 to the indicator drums 1312 and the type wheels 1318–1330, each differential assembly 258 in the cash register 250 is provided with a transfer wheel assembly 1345 (FIG. 5) including three gears or wheels 1346, 1347 and 1348. These three wheels are rotatably mounted on a bearing 1349 carried on a shaft 1350 that is supported between the side walls 961 and 1150, and the transfer wheel units 1345 are supported in spaced positions on the shaft 1350 by a plurality of interposed spacer sleeves 1351. Each of the wheels or gears 1347 is engaged by the teeth on the lower edge of the toothed portion 1155a of the associated indicator rack or slide 1155 (FIG. 2B) and is connected to the wheel 1346 by a tongue 1346a which is formed integral with the wheel 1346 and which is received within a notch 1347a formed in the wheel or gear 1347. Thus, the wheels 1346 and 1347 move together. The wheel 1348 in each of the transfer wheel assemblies 1345 rotates freely about the bearing 1349 and is not connected to the joined wheels 1346 and 1347. In the transfer wheel assemblies 1345 driven by the racks 1155 in the four transaction differential assemblies 258, the wheel 1348 is replaced by a cover plate 1352.

To transmit information from the four indicator racks 1155 in the transaction differential assemblies 258, the driven wheels 1346 in these four assemblies directly mesh with the gears or wheels 1334 secured to the shaft 1331 and the three inner telescoping shafts 1333 to transmit the transaction information to the four transaction type wheels 1327–1330. In addition, the three wheels 1346 driven by the clerk, merchandise and accounting differential assemblies 258 directly mesh with the gears 1316 to set the indicator drums 1312b–1312d. In addition, the wheel 1346 driven by the fifth amount differential assembly 258 directly engages the gears 1334 and 1316 to directly drive the type wheel 1322 and the indicator drum 1312i. However, because the amount information on the indicator drums 1311 and 1312 is to be read from highest order to lowest order when considered from left to right from opposite sides of the machine and because the type wheels 1318–1326 are also to provide information from lowest to highest order when considered from left to right (FIG. 108B), the wheels 1346 driven by the remaining amount differential assemblies 258 cannot directly engage the gears or wheels 1334 and 1360.

To accomplish the necessary inversion in order, the transfer wheel assemblies 1345 driven by all of the remaining amount differential assemblies 258 are reversed in position on the shaft 1350 so that the connected wheel 1346a is disposed to the left (FIG. 5) and is used to drive an intermediate motion transmitting system. This motion transmitting system includes a plurality of telescoping shafts or sleeves 1353 which are rotatably mounted on each other for rotation about the axis of a shaft 1354 that is carried between the side walls 961 and 1150. The telescoping shafts 1353 are rotatably mounted on and spaced from each other by the use of the split nylon bearings 1335 and the spacer sleeves 1336. One end of each of the telescoping shafts 1353 is secured to a gear or wheel 1355 that meshes with and is driven by the driven wheel 1346 in one of the transfer wheel assemblies 1345. The other end of each of the telescoping shafts 1353 is secured to a gear or wheel 1356 that meshes with the idler wheel 1348 in one of the transfer assemblies 1345 and with the gear 1316 connected to one of the indicator drums 1312.

Figure 5B:
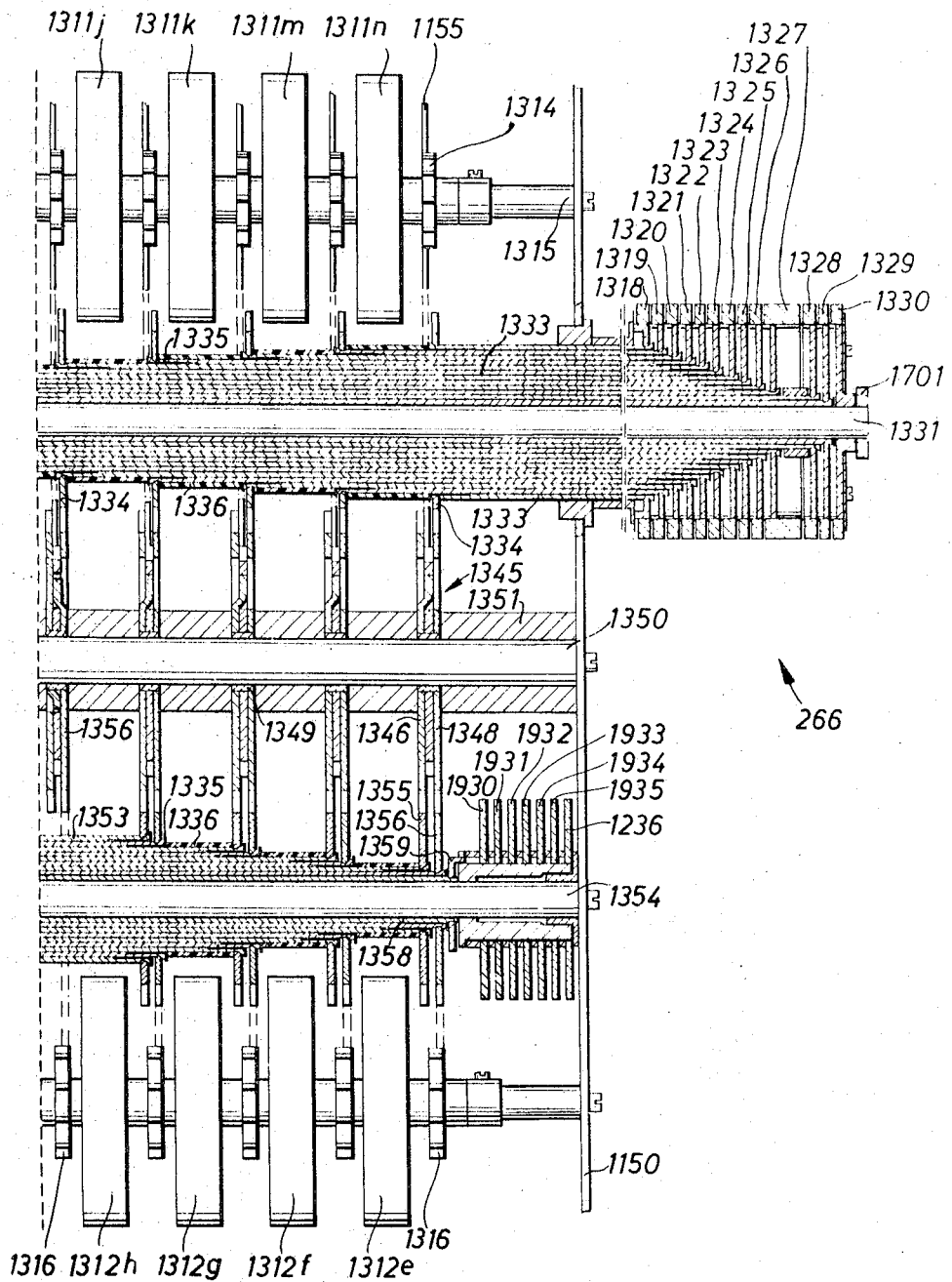

As an example, the gear 1355 driven by the wheel 1346 in the transfer wheel assembly 1348 actuated by the lowest order amount differential assembly 258 drives the connected gear 1356 disposed at the extreme right in FIG. 5B. This gear 1356 engages the extreme right-hand gear 1316 to set the indicator drums 1312e displaying the lowest order amount digit. This gear or wheel 1356 also engages the idler wheel 1348 in the right-hand transfer wheel assembly 1345 (FIG. 5B) which actuates the right-hand gear 1334 that is secured to the lowest order amount wheel 1318. In similar fashion, the remaining pairs of transfer gears or wheels 1355 and 1356 secured to the opposite ends of the telescoping shafts 1353 drive the related indicator drums 1312 and type wheels 1319–1326 to provide information in the proper order in the printing assembly 266 and the back bank of indicator drums 1312.

The shaft 1354 also supports means for transmitting control information from certain of the transaction differential assemblies 258 to various control mechanisms provided in the cash register 250. More specifically, the wheel 1346 in the transfer wheel assembly 1345 driven by the mode of operation differential assembly 258 meshes with a gear or wheel 1357 secured to the left end of a sleeve 1358 (FIG. 5A) that is rotatably mounted on the shaft 1354. The right end of the sleeve 1358 is secured to a member 1359 (FIG. 5B) that shifts a plurality of coded elements, most of which are used to control the operation of the printing assembly 266, to a position corresponding to that of the mode of operation assembly 258. This group of coded discs includes a control disc 1236. In addition, the wheel 1346 in the transfer wheel assembly 1345 driven by the account differential assembly 258 meshes with a gear 1360 that is secured to a sleeve 1361. The sleeve 1361 is rotatably mounted on the outer surface of the sleeve 1358 and is secured to an element 1362 that sets a coded member forming a part of a control for the printing unit 266.

*Aligning and locking means.*—The indicator assembly 260 includes means for aligning the telescoping shafts 1333 and the indicating drums 1311 and 1312 and for locking these components in adjusted positions between successive cycles of operation of the cash register 250. The locking and aligning means for the telescoping shafts 1333 comprises a locking rail 1370 (FIG. 2B) which is slidably mounted within slots 1371 formed in the differential assembly supporting plates 1157 and two plates carried on the walls 961 and 1150. The rail 1370 is adapted to engage the teeth formed on the gears 1334 secured to the telescoping shafts 1333. A compression spring 1372 positioned in the opening 1370 and interposed between an arm of a lever 1373 and the rail 1370 normally biases the rail 1370 to the position shown in FIG. 2B in which it is received within the space between adjacent teeth on the gears 1334. To provide means for shifting the locking rail 1370 into and out of engagement with the wheels 1334, two similar drive means (not shown) are provided. Each of the drive means is disposed adjacent one of the side walls of the frame and each includes one lever 1373 which is pivotally mounted on the frame by a shaft 1374. These drive means pivot the levers 1373 to retract the locking rail 1370 at suitably timed parts of the machine operating cycle.

To provide means for locking the indicator drums 1311 and 1312, a pair of locking members 1382 and 1383 (FIGS. 2B and 3B) are provided for each pair of indicating drums 1311 and 1312, respectively. The outer end of each of these members is formed with a pointed projection adapted to engage the gears 1314 and 1316. The other ends of each of these arms form a U-shaped portion providing a yoke that is pivotally mounted at two points on a shaft 1384 carried between the side walls. The ends of a helical spring 1385 carried on the shaft 1384 between the U-shaped portions continuously biases the member 1382 in a counterclockwise direction about the shaft 1384 and the member 1383 in a clockwise direction about the shaft 1384 to engage the gears 1314 and 1316. The spring 1385 also biases the inner edges of the U-shaped portions into engagement with the sides of a flat shaft 1386.

One end of the flat shaft 1386 is secured to a plate 1387 having an opening through which the shaft 1384 extends. The plate 1387 is pivotally secured to the upper end of a link 1388, and the lower end of the link 1388 is pivotally connected to one of the levers 1373. Thus, when the lever 1373 is pivoted about the shaft 1374 in a clockwise direction at the beginning of each cycle of operation of the cash register, the link 1388 is elevated to turn the shaft 1386 in a clockwise direction about its axis from the normal position shown in FIG. 3. The opposite sides of the shaft 1336 bear against the yoke portions of the members 1382 and 1383 so that the arms 1382 are pivoted in a clockwise direction about the shaft 1384 against the action of the springs 1385 to move the ends of these members out of engagement with the gears 1314. Similarly, this turning movement of the shaft 1386 moves the members 1383 in a counterclockwise direction about the shaft 1384 against the action of the springs 1385 to lift the ends of the members 1383 out of engagement with the gears 1316. This permits the indicator drums 1311 and 1312 to be set under the control of the differential assemblies 258. When the lever 1373 is restored to its normal position, the link 1388 moves downwardly, and the shaft 1386 is restored to its normal position so that the ends of the members 1382 and 1383 again engage the teeth on the gears 1314 and 1317 to secure the indicator drums 1311 and 1312 in their adjusted positions.

ACCUMULATOR ASSEMBLY 264

The accumulator assembly 264 (FIG. 2) is operated by the plurality of amount differential assemblies 258 during listing operations to store items of information received from the amount banks 276. During reading operations, the accumulator assembly 264 supplies information through the amount differential assemblies 258 to the indicating assembly 260 and the printing assembly 266, and this information is subsequently returned to storage in the accumulating assembly 264. During resetting operations, the data stored in the accumulator assembly 264 is removed therefrom and transferred through the amount differential assemblies 258 to the indicating assembly 260 and the printing assembly 266. In the illustrated embodiment of the cash register 250, the accumulator assembly 264 includes five totalizer or accumulator lines or shafts providing a customer number register, an account accumulator group, a merchandise accumulator group, a clerk accumulator group, and an itemizing accumulator or itemizer, considered from right to left in FIG. 2.

The operation of the accumulator assembly 264 is selectively controlled by the transaction banks of the keyboard assembly 256 through an accumulator control unit or means. The accumulator control unit controls the times at which the plurality of accumulator lines are moved into and out of engagement with the amount differential assemblies 258 to control the performance of listing, reading or resetting operations. In addition, the control unit is controlled by the account bank, the merchandise bank, and the clerk bank to select different ones of the plurality of accumulating means provided in each of the accumulator groups for engagement with the amount assemblies 258.

The accumulator groups are mounted between a left frame element or wall 1436 and a similar right frame element or wall which are supported beneath the differential assemblies 258 and between the side walls of the main frame of the cash register 250. The side walls including the wall 1436 are secured together in a spaced relation by a plurality of connecting shafts 1438. Each of the accumulator groups includes a shaft 1439 carrying a number of groups of uniformly spaced accumulator gears or wheels 1451 that is equal to the number of individual accumulators provided in each accumulator group. Since the cash register 250 is provided with nine amount differential assemblies 258, each complete set of accumulator gears on the shafts 1439 includes nine individual accumulator gears 1451 each representing a separate denominational order.

The accumulator control unit raises and lowers one or different combinations of the shafts 1439 to selectively couple the gears 1451 with the toothed portions 1151*b* on the slides 1151 in read, reset, or list timing to control the transfer of information between the accumulator assembly 264 and the amount differential assemblies 258. The accumulator control unit selects different sets of gears 1451 or different individual accumulators within a selected accumulator group by axially shifting the shafts 1439 under the control of the settings of the transaction differential assemblies 258.

PRINTING ASSEMBLY 266

The printing assembly 266 (FIGS. 6–40) includes a type wheel assembly 1670 (FIG. 6) having a plurality of type wheels providing amount, date and consecutive number information that is disposed between a receipt printing assembly 1671 and an audit strip printing assembly 1672.

The receipt assembly 1671 is provided with a length of paper tape from a roll 1673 thereof and includes means for printing different types of information on the paper tape during total operations of the cash register 250. The receipt printing assembly 1671 also includes severing means that are controlled to provide tickets or receipts of varying lengths incident to the recording operations. The operability of the receipt printing assembly 1671, the distance that the tape from the roll 1673 is advanced incident to recording operations, and the information recorded on each receipt is programmed under the control of a printer control unit or assembly 1674 (FIGS. 28–33). The printer control unit 1674 is controlled by the account differential assembly 258 and the lock bank 281.

The audit strip assembly 1672 is supplied with paper tape from a supply roll 1675 and is operated during selected listing and total operations of the cash register 250 to record amount and consecutive number information on the tape. The printed paper tape from the roll 1675 comprising the audit strip is wound onto a removable spindle or reel 1676 that permits the recorded audit strip to be removed from the cash register 250 at any desired time. The operability of the audit strip printing assembly 1672 is controlled by the mode of operation differential assembly 258.

The components of the printing assembly 266 are carried on three vertically extending frame elements 1677–1679 (FIG. 3B) which are rigidly secured together and connected by removable fasteners (not shown) to the left wall 1150 of the main frame of the cash register 250. The operating mechanisms of the printing assembly 266 are driven from the main shaft 1073 of the cash register 250 by means of an arm (not shown) that is secured to the left end of the main shaft 1073 adjacent the frame element 1150. A lug or projection carried on this arm is received within an opening 1680 (FIGS. 7 and 8) in a cam 1681 that is keyed to a sleeve 1682. The sleeve 1682 is rotatably mounted on a shaft or rod 1683. The left end of the shaft 1683 is carried on the frame element 1678 and the right end of this shaft is carried on a supporting plate 1684 that is secured to the frame element 1677 by a plurality of machine bolts 1685. The rotation of the main shaft 1073 produces clockwise rotation of the cam 1681 and of the sleeve 1682 secured thereto.

To transmit the driving power supplied from the main shaft 1073 to the various components of the printing assembly 266, a gear 1686 keyed to the sleeve 1682 meshes with a gear 1687 that is keyed to a sleeve 1688 carried on a shaft 1689 which is supported between the walls 1677 and 1678. The gear 1686 also meshes with a gear 1690 keyed to a sleeve 1691 that is carried on a shaft 1692 extending between the walls 1677 and 1678. A second gear 1693 that is also keyed to the sleeve 1691 engages a gear 1694 that is keyed to a sleeve 1695 carried on a shaft 1696 supported between the walls 1677 and 1678. Thus, the rotation of the cam 1681 and the sleeve 1682 results in the synchronized rotation of the three sleeves 1688, 1691 and 1695. The remaining driving components of the printing assembly 266 are driven by cams or mechanisms carried on or actuated by these sleeves.

*Type wheel assembly 1670.*—The type wheel assembly 1670 is disposed between the receipt printing assembly 1671 and the audit strip printing assembly 1672 (FIG. 6) and includes means for producing four spaced lines of information on the receipt and one line of information on the audit strip. The line of information common to both the receipt and the audit strip includes both the information supplied by the type wheels 1318–1330 (FIG. 5B) representing the setting of the differential assemblies 258 in the cash register 250 and a consecutive number that is advanced in value each time that a total operation is performed following a listing operation. This total-after-listing consecutive number is provided by a plurality of type wheels 1700 (FIG. 9) which are rotatably mounted on a hub 1701. The hub 1701 is supported on a cover plate 1702 (FIG. 6) that is secured to and spaced from the frame element 1678. The end of the shaft 1331 (FIG. 5B) is journaled in the hub 1701. The wheels 1700 (FIG. 9) are provided with type faces and are actuated to consecutive number settings by a plurality of wheels 1703 which are actuated by a plurality of pawls or arms 1704 pivotally mounted on a U-shaped element 1705a secured to a sleeve 1705. The type wheels 1700 are locked in operated position by an aligning and locking arm 1706 that is secured to a shaft 1707. The type wheels 1700 and the actuating means therefor are of a conventional construction.

To provide means for actuating the type wheels 1700, the sleeve 1705 is secured to a depending arm 1708a of a yoke 1708 (FIG. 10) by a link 1709 which is pivotally connected to the lower end of the arm 1708a and which is pivotally connected to the sleeve 1705 by a pin 1710. The yoke 1708 is pivotally mounted on a shaft 1711 carried by the frame elements 1677 and 1678 and includes a cam follower arm 1708b that is resiliently biased toward a coded control element 1712 by a tension spring 1713 that is connected between the arm 1708b and the frame.

The coded element 1712 is one of a number of similar elements in the printing assembly 266 that are rigidly secured to a sleeve 1714 rotatable on a shaft 1715. The shaft 1715 is rotatably mounted on the frame element 1677 at one end and at its other end in a plate 1716 (FIG. 12) that is secured to the frame element 1677 by a plurality of supports 1717. The sleeve 1714 is rigidly secured to an L-shaped element 1718 (FIG. 3B) having a horizontally extending arm that passes through aligned openings in the frame elements 1150 and 1677 to be secured to the control disc or cam 1236. As described above, the disc 1236 is set to one of eleven different settings in dependence on the setting of the mode of operation differential assembly 258. Thus, the control cam 1712 is also set in one of eleven corresponding settings in dependence on the position to which the mode of operation differential assembly 258 has been adjusted.

The yoke 1708 is periodically rendered effective to sense the setting of the coded means 1712 once during each cycle of operation of the cash register 250 under the control of a cam follower lever 1719 that is pivotally mounted on a shaft 1720 carried on the frame elements 1677 and 1678. An arm or pin 1721 secured to the lever 1719 bears against the arm 1708a and normally holds the yoke 1708 in the position shown in FIG. 10. An additional arm or shaft 1722 carried on the lever 1719 bears against an arm 1723 secured to the actuating shaft 1707 for the aligning means. A roller 1724 rotatably mounted on the shaft 1722 is resiliently biased into engagement with the outer periphery of a control cam 1725 by a tension spring 1726 connected between the lever 1719 and the frame of the cash register 250. The cam 1725 is keyed to the sleeve 1695 and is rotated in a counterclockwise direction.

When the cash register 250 is placed in operation, the clockwise rotation of the cam 1725 permits the tension spring 1726 to pivot the lever 1719 in a counterclockwise direction about the shaft 1720 between 119° and 155° of rotation of the main shaft 1073 (see line 4 in FIG. 40). This moves the shaft 1722 into engagement with the arm 1723 so that the aligning and locking means 1706 are released. This counterclockwise movement of the lever 1719 also frees the yoke 1708 for clockwise rotation about the shaft 1711 under the control of the tension spring 1713. If the free end of the cam sensing arm 1708 engages the outer periphery of the coded element 1712, the consecutive numbering wheels 1700 are not actuated. Alternatively, if the coded element 1712 has been adjusted to its eleventh setting representing a total following a listing operation, the depending portion on the arm 1708b enters a recess 1712a in the coded control means 1712, and the yoke 1708 pivots in a clockwise direction about the shaft 1711 to move the link 1709 to the left. This rotates the sleeve 1705 in a clockwise direction about the shaft 1707. The continuing rotation of the cam 1725 between 335° and 355° (see line 4 in FIG. 40) pivots the cam follower lever 1719 in a clockwise direction about the shaft 1720 so that the yoke 1708 is restored to its normal position. The oscillation imparted to the sleeve 1705 by the cam 1725 during a cycle of operation in which a total is performed following a listing operation actuates the arms 1704 and the wheels 1703 so that the type wheels 1700 are set to a position representing the next highest number. The type wheel 1700 can be manually reset by any suitable means.

As illustrated in FIG. 6, the amount data and total-after-listing consecutive number provide the uppermost line of information that is recorded by both the receipt printing assembly 1671 and the audit strips printing assembly 1672. Thus, the plurality of type wheels 1318–1330 and 1700 are provided with two complete sets of digits, one facing to the left and one facing to the right, to permit identical type faces to be disposed in printing position adjacent both of the printing assemblies 1671 and 1672. The type wheel assembly 1670 next includes two spaced clichés (not shown) positioned downwardly and to the left beneath the plate 1702 from the wheels 1318–1330 and 1700 for providing the fixed items of information, such as the name of the establishment in which the cash register 250 is located. The clichés are used to print information on only the receipts or tickets during the operation of the assembly 1671. The next or lowest line of information includes the total-after-reset consecutive number and the date information and is also printed on only the receipts by the receipt printing assembly 1671. This information is provided by a plurality of type wheels disposed between the cover plate 1702 and the supporting element 1678.

More specifically, date information is provided by two year type wheels 1730 and 1731 (FIG. 11), two date type wheels 1732 and 1733, and a type wheel 1734 having alphabetical characters representing the month. The type wheels 1730–1734 are set by a plurality of gears 1735 that are actuated by the manual manipulation of the plurality of dials 1736 shown in FIG. 6. To provide a printed record of the identity of the cash register 250, a group of type wheels 1737 are disposed adjacent the year type wheels 1730 and 1731.

To provide a consecutive number advanced by each total operation following a reset operation, a plurality of type wheels 1738 are provided which are actuated by individual counting wheels. The counting wheels are actuated by a plurality of arms 1739 which are pivotally mounted on a yoke element 1740. The type wheels 1738 are aligned and locked in position by an aligning arm 1741. The counter or consecutive number printing assembly including the elements 1738–1741 is of conventional construction.

To provide means for actuating the total-after-reset consecutive number type wheels 1738 whenever the cash register performs a total operation following one or more resetting operations, a pair of differentially operable yokes 1742 and 1743 (FIG. 12) are pivotally mounted on the shaft 1711. The yoke 1742 includes a depending arm 1742a disposed to the left of a pin 1744 that extends through a slot in a frame element 1678 and is secured to the yoke 1740. The depending arm 1742a also defines a cam slot 1745 in which is received a pin 1746 that extends through a slot in the wall 1678 and is secured to the aligning arm 1741. A depending arm 1743a on the yoke 1743 is disposed adjacent the pins 1744 and 1746.

The setting of the differential yokes 1742 and 1743 is controlled by a pair of coded elements 1747 and 1748 which are pivotally mounted on the shaft 1715 and which are set to eleven different positions corresponding to the eleven settings of the mode of operation differential assembly 258. The two yokes 1742 and 1743 are provided with a pair of cam follower arms 1742b and 1743b for selectively engaging the peripheries of the coded control elements 1748 and 1747, respectively. The yokes 1742 and 1743 are selectively actuated by a link 1749 carrying a pin 1750 at its free end that extends through a pair of cam slots 1751 and 1752 in the yokes 1742 and 1743, respectively. The other end of the link 1749 is pivotally connected to one end of a cam follower lever 1753 which is pivotally mounted on the shaft 1720. The cam follower lever 1753 carries a roller 1754 that is adapted to engage the periphery of a cam 1755, and a pin 1756 carried on the cam 1755 is adapted to engage an arm 1753a on the cam follower lever 1753. The cam 1755 is keyed to the sleeve 1695 and is rotated in a clockwise direction.

When the cash register 250 is placed in operation, the coded elements 1747 and 1748 are first adjusted to a position corresponding to the setting of the mode of operation differential assembly 258. If a reset operation controlled by the keys in the bank 281 is being performed, the coded elements 1747 and 1748 are set to their sixth position in which the recess in the element 1747 is aligned with the arm 1743b and the projection forming the element 1748 is aligned with the arm 1742b. In the interval between 165° and 180° (see line 3 in FIG. 40), the pin 1756 engages the arm 1753 to pivot the cam follower lever 1753 in a counterclockwise direction about the shaft 1720. This moves the link 1749 upwardly and moves the pin 1750 upwardly in the slots 1751 and 1752 from the normal position shown in FIG. 12. The cam follower arm 1742b encounters the element 1748, and the arm 1743b enters the recess in the element. Thus, only the yoke 1743 is free to move in a counterclockwise direction about the shaft 1711. This moves the arm 1743a to the left to displace the pins 1744 and 1746 to the position shown in FIG. 12. The pins remain in this position when the engagement of the cam 1755 by the roller 1754 restores the lever 1753 to its normal position between 215° and 250° (see line 3 in FIG. 40).

This operation is repeated so long as the mode of operation differential assembly 258 is adjusted to its sixth position during reset operations. However, when this assembly is adjusted to any other setting, which must first be a total operation because of the program of the cash register 250, the arm 1743b is aligned with the outer periphery of the element 1747 and the arm 1742b is not aligned with the element 1748. This means that the yoke 1743 is blocked and the yoke 1742 is free to pivot. During 165° to 180° of movement of the first cycle following a reset operation, the yokes 1742 and 1743 are actuated, but movement of the yoke 1743 is blocked. The yoke 1742 pivots about the shaft 1711 to move the arm 1742a to the right (FIG. 12). The pin 1746 is actuated by the cam slot 1745 to release the locking means, and the pin 1744 is moved to the right to actuate the wheels 1738 to the next highest value. The yokes 1742 and 1743 are restored to normal between 335° and 355° by the cams 1755. Thus, the wheels 1738 are conditioned for operation during resetting operation of the cash register 250 and are advanced during the first following operation that is not a reset operation.

*Ribbon feed assembly.*—The printing assembly 266 includes a ribbon feed assembly for moving an inked ribbon from one of a pair of ribbon spools 1760 and 1761 (FIG. 6) through a passage extending between the type wheel assembly 1670 and the printing assemblies 1671 and 1672 so that the information represented by the settings of the type wheels in the assembly 1670 can be transferred to the paper tapes supplied from the rolls 1673 and 1675 by striking the paper tape against the type wheels with the inked ribbon interposed therebetween. The ribbon is guided around the path shown in FIG. 6 by a plurality of guide rollers (not shown) carried between the frame 1678 and the cover plate 1702. The ribbon assembly advances the inked ribbon through a step of movement in response to each cycle of operation of the printing assembly 266 and includes means for automatically changing the direction of movement of the inked ribbon as soon as the supply on one of the spools 1760 and 1761 is depleted.

The spool 1760 is secured to a shaft 1762 (FIGS. 13 and 15) which is rotatably mounted on the frame element 1678 and is secured to a ratchet wheel 1763. Similarly, the spool 1761 is secured to a shaft 1764 that is pivotally mounted on the frame 1768 and secured to an oppositely directed ratchet wheel 1765. The ratchet wheels 1763 and 1765 are adapted to be alternately engaged by the opposite end portions 1766a and 1766b of a pawl 1766 that is pivotally mounted on one end of a yoke 1767 by a pivot pin 1768. The pawl 1766 is resiliently latched in a clockwise deflected position engaging the ratchet 1763 or a counterclockwise deflected position in which the end portion 1766b engages the ratchet wheel 1765 by a detent element 1769 that is adapted to engaged opposite sides of a projecting portion 1766c on the pawl 1766.

The detent pin 1769 is secured within an opening 1770 on a member 1771 that is slidably mounted on a shaft 1772 by a slot 1773 in the member 1771. A notch 1771a in the member 1771 receives one end of the pin 1768. A compression spring 1774 disposed in a slot 1775 in the arms 1767a is interposed between a notch at the right end of the slot 1775 and a lug at the left end of the opening 1773 to bias the member 1771 and the latching pin 1779 to the left into engagement with the projecting portion 1766c on the pawl 1766. In the position shown in FIG. 13, the detent pin 1769 engages the upper surface of the projecting portion 1766a to hold the upper end 1766a of the pawl 1766 in engagement with the ratchet wheel 1763 for driving the upper tape spool 1760.

To provide means for actuating the ribbon advancing mechanism, a second arm 1767b of the yoke 1767 is pivotally connected to one end of a cam follower lever 1776 (FIG. 14) by a pivot pin 1777 that is secured to the arm 1767b and is received within an opening in the cam follower lever 1776. This lever is pivotally mounted on a shaft 1779 that is carried by the frame elements 1677 and 1678 and defines a notch or recess 1780 in which is received a cam 1781 that is keyed to the sleeve 1695.

When the cash register 250 is placed in operation and the cam 1781 is rotated in a clockwise direction, the cam follower lever 1776 is rocked first in a clockwise direction between 30° and 65° and then a counterclockwise direction between 140° and 175° (see line 10 in FIG. 40) to pivot the yoke 1767 in a counterclockwise and then a clockwise direction about the shaft 1772. When the yoke 1767 is pivoted in a counterclockwise direction, the engaged pawl portion 1766a slides over the teeth on the ratchet wheel 1762 so that when the yoke 1767 then pivots in a clockwise direction about the shaft 1772, the pawl portion 1766a engages the ratchet wheel 1763 and pivots the shaft 1762 in a clockwise direction (FIG. 13) about its axis so that the spool 1760 is advanced in a counterclockwise direction (FIG. 6) to withdraw the ribbon from the spool 1761.

To provide means for detecting the exhaustion of the tape supply on one of the spools and thus automatically initiate a reverse in the direction of movement of the inked ribbon, a pair of detecting plates 1782 and 1783 which are pivotally mounted on a shaft 1784 are resiliently biased into engagement with the inked ribbon on the spools 1760 and 1761, respectively, by the opposite ends of a helical spring 1785. The two detecting plates 1782 and 1783 include two arm portions 1782a and 1783a which extend through the frame member 1768 to be disposed adjacent spaced end portions 1786b ad 1786a, respectively, on a direction changing arm 1786 that is pivotally mounted on the shaft 1772. A pin 1787 secured to the pawl 1766 is received within an opening 1788 in the arm 1786.

In the illustrative example set forth above in which the tape is wound onto the spool 1760 from the spool 1761, the depletion of the supply of ribbon remaining on the spool 1761 permits the detecting plate 1783 to be pivoted in a counterclockwise direction about the shaft 1784 (FIG. 13) so that the upper end of the arm 1783a moves under the projection portion 1786a on the arm 1786. When the cash register 250 is next operated and the yoke 1767 is pivoted in a counterclockwise direction about the shaft 1772, the pin 1787 bears against the lower edge of the slot 1788 in the arm 1786 and prevents downward movement of the pawl 1776. The pin 1787 provides a fulcrum about which the pawl 1766 pivots so that the projecting portion 1766c engages the pin 1769 and cams the member 1771 to the right against the action of the spring 1773 to permit the pawl 1766 to pivot in a counterclockwise direction about the pin 1768. This moves the pawl portion 1766b into engagement with the ratchet 1765 and moves the pawl portion 1766a out of engagement with the ratchet wheel 1763. Thus, during succeeding cycles of operation the rotation of the cam 1781 causes the rotation of the spool 1761 so that the inked ribbon is withdrawn from the spool 1760 and moves in an opposite direction to be wound onto the spool 1761.

As the spool 1761 fills, the detecting plate 1783 is pivoted in a clockwise direction about the shaft 1784, and the detecting plate 1782 is pivoted in a similar direction by the depletion of the ribbon on the spool 1760. At the point at which the ribbon supply on the spool 1760 approaches depletion, the detecting plate 1782 has been pivoted a sufficient amount in a clockwise direction about the shaft 1784 that the end portion 1782a is disposed in the path of movement of the lower arm 1786b on the arm 1786 to cause the pawl 1766 to be pivoted in a clockwise direction about the pin 1768 to again reverse the direction of the drive of the ribbon transport mechanism.

*Audit strip printing assembly 1672.*—The audit strip printing assembly 1672 includes a hammer means for forcing paper withdrawn from the roll 1675 against the ribbon and the upper line of type wheels to record the information supplied from the body of the cash register 250 and the total-after-listing consecutive number during selected modes of operation of the cash register 250. This assembly also includes a ratchet mechanism for advancing the paper tape means for driving the spool 1676 to wind the printed paper tape advanced by the ratchet assembly. The audit printing assembly 1672 is selectively rendered effective or ineffective under the control of the setting of the mode of operation differential assembly 258.

To advance the paper tape from the roll 1675, the assembly 1672 includes a driven roller 1800 (FIGS. 6, 16, and 17) secured to a shaft 1801 that is rotatably mounted on the frame element 1678. A pressure roller 1802 (FIG. 6) rotatably mounted on a bracket 1803 presses the tape against the driven roller 1800. The bracket 1803 is pivotally mounted on the frame element 1678 and resiliently biased toward the driven roller 1800. To provide means for rotating the roller 1800, a ratchet wheel 1804 (FIGS. 16 and 17) is secured to the shaft 1801 and is engaged by the pawl 1805 that is pivotally mounted on an arm 1806 by a pin 1807. The arm 1806 is pivotally mounted on the shaft 1801.

The paper tape and ribbon are driven against the upper line of type wheels by a hammer element 1808 (FIGS. 6, 18, and 19) which is slidably mounted on the legs of a U-shaped bracket 1809 carried on the frame element 1678. The outer end of the hammer member 1808 is provided with a flange 1808a to which a resilient member 1810 is secured. The hammer 1808 is moved to the right from the position shown in FIG. 18 to the released position shown in FIG. 19 by a compression spring 1811 which is disposed within a central opening in the hammer 1808 and which is interposed between a shoulder on this element and the left-hand leg of the U-shaped supporting bracket 1809. To provide means for latching the hammer 1808 in the cocked or loaded position shown in FIG. 18, a latching plate 1812 is disposed within the bracket 1809 and pivotally connected to the right-hand leg thereof. The left end of the latching plate 1812 includes an upwardly projecting portion 1812a that is adapted to be received within an opening 1813 (FIG. 18) in the hammer element 1808. When the hammer 1808 is moved to the left from the released position shown in FIG. 19 by compressing the spring 1811, the lug 1812a is moved into alignment with the opening 1813 and is snapped into interlocking engagement therewith by a compression spring 1814 interposed between the bight portion of the U-shaped bracket 1809 and the lower surface of the latching plate 1812.

To provide means for actuating the tape drive and the hammer means in the audit strip printing assembly 1672, a bracket 1815 is pivotally mounted on a fixed shaft 1816. An arm 1815a of the bracket 1815 includes a U-shaped notch in which the pin 1807 is received. Another arm 1815b is received within aligned slots 1817 in the hammer 1808 and the latching plates 1812 (FIG. 18). The other end of the actuating yoke 1815 extends through an opening 1818 (FIG. 7) in the frame element 1678 and includes an upstanding arm 1815c to which a tension spring 1819 secured at one end to the frame element 1678 is secured. The tension spring 1819 biases a projecting portion 1815d into engagement with the upper end of a cam follower lever 1820 that is pivotally mounted on the frame 1678 by a shaft 1821. The lower end of the lever 1820 carries a cam follower roller 1822 that is biased into engagement with the outer periphery of a cam 1823 by the spring 1819. The cam 1823 is keyed to the sleeve 1688 and is rotated in a counterclockwise direction from the normal position shown in FIG. 16 when the cash register 250 initiates a cycle of operation.

When a cycle of operation of the cash register 250 is initiated, the cam 1823 is rotated in a counterclockwise direction through 230° (see lines 8 and 9 in FIG. 40). In the interval from 230° to 260°, the roller 1822 enters the depression in the cam 1823 so that the tension spring 1819 is effective to pivot the cam follower lever 1820 in a clockwise direction about the shaft 1821 and the yoke 1815 in a counterclockwise direction about the shaft 1816. The counterclockwise movement of the arm 1815a is effective through the pin 1807 and the arm 1806 to slide the pawl 1805 idly over the teeth on the ratchet wheel 1804 to the position shown in FIG. 17. During this movement, the arm 1815d on the yoke 1815 moves to the right from the position shown in FIG. 18 to the position shown in FIG. 19. At 240° (see line 9 in FIG. 40), the end of the arm 1815b engages and cams against a struck-out portion 1812b on the latching plate 1812 so that this plate is pivoted in a counterclockwise direction about the right arm of the U-shaped bracket 1809. This moves the lug 1812a out of the opening 1813 so that the compressed spring 1811 drives the hammer 1808 to the right to press the interposed portion of the tape from the roll 1675 and the inked ribbon against the top line of the type wheels to print the information supplied by the cash register 250 and the total-after-listing consecutive number on the audit strip.

The continuing counterclockwise rotation of the cam 1823 in the interval between 260° and 330° of rotation of the main shaft 1073 (see lines 8 and 9 in FIG. 40) pivots the lever 1820 in a counterclockwise direction about the shaft 1821 to pivot the yoke 1815 in a clockwise direction about the shaft 1816 against the action of the tension spring 1819. During this movement, the arm 1815a engages the pin 1807 to move the arm 1806 from the position shown in FIG. 17 to the position shown in FIG. 16 so that the pawl 1805 bears against the engaged tooth on the ratchet wheel 1804 to rotate the shaft 1801 and the drive roll 1800 in a clockwise direction (FIG. 6) to advance the paper tape from the roll 1675. This places a blank portion of the tape adjacent the upper line of type wheels in the type wheel assembly 1670. Further, this clockwise rotation of the bracket 1815 moves the depending arm 1815b from the position shown in FIG. 19 to the position shown in FIG. 18. During this movement, the lower end of the arm 1815b engages the back edge of the slot 1817 in the hammer 1808 and moves this hammer to the left from the position shown in FIG. 19 to the position shown in FIG. 18. When the lug 1812a is again aligned with the opening 1813, the compression spring 1814 moves the lug 1812a into interlocking relation with the opening 1813 and holds the hammer 1808 in a latched position with the spring 1811 in a compressed condition.

To provide means for rotating the removable spindle or reel 1676 to wind the printed paper tape advanced by the drive roll 1800, the wheel or spool 1676 is detachably secured to a shaft 1824 (FIG. 7) that is rotatably mounted on the frame element 1678. A pulley 1825 is secured to the shaft 1824 and receives a drive belt 1826 that passes around a second pulley 1827 keyed to the sleeve 1691. The pulleys 1825 and 1827 and the belt 1826 provide a slipping drive for the shaft 1824 so that the spool 1676 is rotated a sufficient distance to take up the paper tape advanced by the drive roll 1800.

As indicated above, the audit strip printing assembly 1672 is selectively rendered effective and ineffective to record the information supplied by the top line of type wheels in dependence on the setting of the mode of operation differential assembly 258. To accomplish this control, a link 1828 (FIG. 7) is provided with an end portion 1828a which extends through the opening 1818 adjacent but spaced from the bight portion of the yoke 1815. This end of the link 1828 is slidably mounted on a pin 1829 (FIG. 7) and is biased for movement to the left by a tension spring 1830 connected between the frame 1678 and the link 1828.

The right end of the link 1828 is connected to a depending arm 1831a (FIG. 20) on a yoke 1831 that is pivotally mounted on the shaft 1711. A lower end of the arm 1831a bears against the pin 1721 carried on the cam follower lever 1719. The yoke 1831 also includes a sensing or detecting arm 1831b that is disposed adjacent a coded control element 1832 (FIGS. 20 and 37) that is pivotally mounted on the shaft 1715. The element 1832, which is set to eleven positions corresponding to the eleven settings of the mode of operation differential assembly 258, is provided with a pattern of projections and recessed portions 1832a representing the operations in which the audit strip printing assembly 1672 is to be operated and rendered ineffective, respectively. The coded member 1832 illustrated in FIG. 37 includes recesses or notches 1832a to cause the operation of the assembly 1672 in the fourth, fifth and ninth settings of the mode of operation, differential assembly 258 corresponding to listing operations and prevents the operation of this assembly in the remaining settings.

When the cash register is placed in operation and the cam 1725 is rotated in a clockwise direction, the lever 1719 is pivoted in a counterclockwise direction about the shaft 1720 between 119° and 155° (see line 4 in FIG. 40) and moves the pin or shaft 1721 away from the lower end of the arm 1731a. This permits the tension spring 1830 to move the link 1828 toward the left to pivot the yoke 1831 in a clockwise direction about the shaft 1711. When the projection on the arm 1831b engages a projection on the element 1832, further movement of the link 1828 is arrested, and the audit strip print assembly 1672 operates in the manner described above. Alternatively, when the arm 1831b encounters a recess 1832a in the member 1832, the bracket 1831 pivots further in a clockwise direction about the shaft 1711, and the link 1828 is moved to an extreme left-hand position in which the projecting portion 1828a is interposed between the upper edge of the bight portion of the bracket 1815 and the upper edge of the opening 1818. This secures the bracket 1850 in the normal position shown in FIGS. 7 and 16 and prevents the operation of either the hammer 1808 or the drive means for the driven roll 1800. Thus, the audit strip printing assembly 1672 is held in an inoperative condition.

*Receipt printing assembly 1671.*—The receipt printing assembly 1671 includes a tape feed assembly for advancing different lengths of tape from the roll 1673 during different types of printing operations to provide receipts with the items of information thereon spaced different distances and to provide receipts of different lengths. This assembly also includes a means for pulling the tape from the roll 1673 to provide a loose loop of tape that is more easily advanced by the controlled tape feed assembly. The receipt assembly 1671 also includes a severing means operated in synchronism with the tape feeding means for severing printed lengths of the paper tape from the strip thereof to provide receipts. In order to provide different combinations of recorded data items on the receipts, the assembly 1671 includes a printing assembly with four hammers disposed adjacent the upper line of type wheels, the two interposed clichés, and the lower line of type wheels. These four hammers are selectively operated under the control of the printer control unit 1675 in dependence on the settings of the mode of operation and account differential assemblies 258 and the actuated or normal condition of the no-receipt means in the lock bank 281. The print or control unit 1675 also controls the operation of the severing means and the length of tape advanced incident to each recording operation by the controlled tape feed means.

In general, the receipt printing assembly 1671 is disposed to the left of the type wheel assembly 1670 (FIG. 6) and includes a tape guide 1840 through which tape is advanced to be disposed between the hammers in the assembly 1671 and the inked ribbon. The slack producing means is disposed between the tape guide 1840 and the roll 1673. The tape feeding means and the severing means are disposed between the hammer assembly and the outlet 272 (FIG. 1) through which the completed receipt is discharged to the exterior of the printer housing 268.

Referring now more specifically to the controllable hammer assembly, this assembly includes four hammer slides 1841–1844 (FIGS. 6 and 21) which are disposed immediately opposite the lower line of type wheels, the two clichés, and the upper line of type wheels, respectively. The hammer slides 1841–1844 are slidably mounted in two slotted supporting walls or members 1845 and 1846 (FIGS. 6 and 21–23) which are secured between the supporting frame elements 1678 and 1679 by a plurality of shafts or rods 1847. Each of the hammer slides 1841–1844 carries a resilient element 1848 at the end disposed adjacent the type wheel assembly 1670.

To provide means for resiliently actuating the hammer slides 1841–1844, each of these slides is provided with an opening or slot 1849 (FIGS. 22 and 23) in which is disposed a compression spring 1850. When the slides 1841–1844 are moved from the released position shown in FIG. 22 to the loaded position shown in FIG. 23, the compression spring 1850 bears against the supporting element 1845 and is compressed between this supporting element and the front edge of the slot 1849. To cushion the power stroke of the hammer slides 1841–1844, each of these slides is provided with a second slot or opening 1851 in which is disposed a compression spring 1852. When the slides 1841–1844 are moved forwardly by the compressed springs 1850, the front edges of the springs 1852 engage the supporting element 1846 to resiliently cushion the termination of the power stroke.

Figure 8:
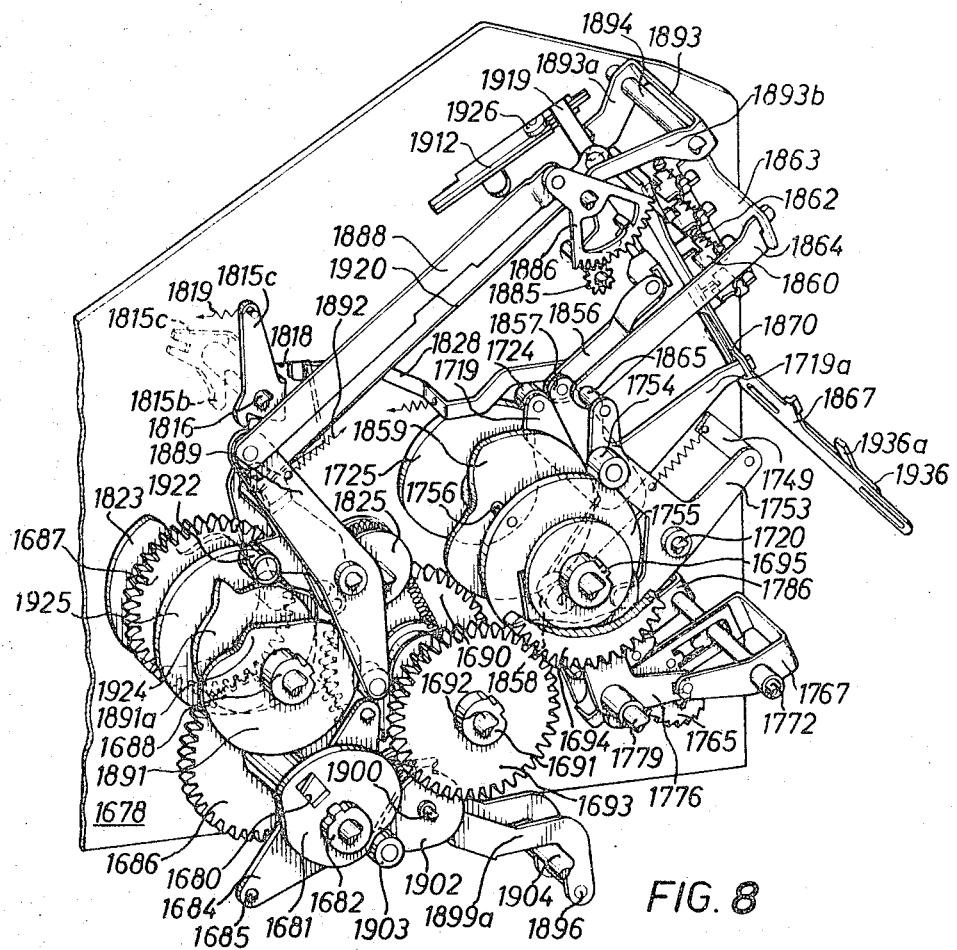
FIGURE 8 is a perspective view similar to FIGURE 7 illustrating driving and control mechanisms included in the printing assembly.
Figure 13:
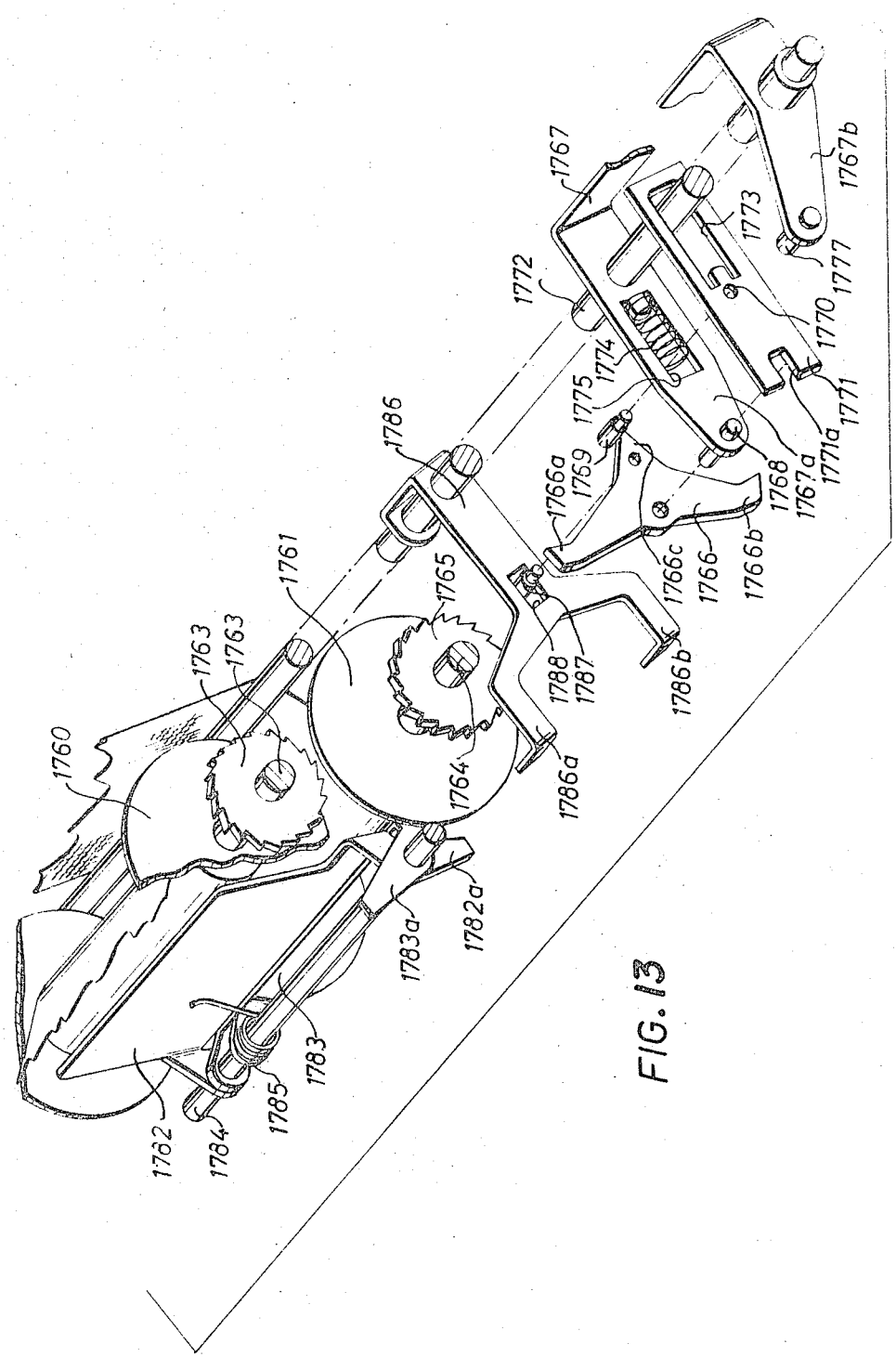
FIGURE 13 is an exploded perspective view of a ribbon drive mechanism included in the printing assembly.

The hammer slides 1841–1844 are moved from the released position shown in FIG. 22 to the cocked or loaded position shown in FIG. 23 by a lever 1853 which extends through an opening in the frame element 1678 and is pivotally mounted on a shaft 1854 carried on the frame 1678 adjacent the opening therein. The outer end of the lever 1853 includes four spaced fingers or lugs, each of which bears against one of four rollers 1855 pivotally mounted on the hammer slides 1841–1844. The other end of the lever 1853 is pivotally connected to a link 1856 that is pivotally secured to the upper end of a cam follower lever 1857 (FIG. 8). The lever 1857 is pivotally mounted on the shaft 1720 and carries a cam follower roller 1858 at its lower end that bears against the outer periphery of a cam 1859. The cam 1859 is keyed to the sleeve 1695 and is rotated in a clockwise direction.

In the normal condition of the cash register 250, the roller 1858 engages a larger radius portion of the cam 1859 and is effective through the link 1856 to hold the lever 1853 in engagement with the four rollers 1855. When a cycle of operation of the cash register 250 is initiated, the radius or the portion of the cam 1859 engaged by the roller 1858 increases slightly as the cam moves from 0° to 165° (see line 2 in FIG. 40) so that the link 1856 pivots the lever 1853 in a counterclockwise direction about the shaft 1854 to retract the hammer slides 1841–1844 from the position shown in FIG. 22 to the position shown in FIG. 23. During this movement, the springs 1850 are compressed. During the interval between 165° and 185°, the hammers 1841–1844 that are to be used during the printing operation are selectively latched in position by the controlled pawl assembly.

Beginning at 185°, the roller 1858 encounters a depression in the periphery of the cam 1859 so that the cam follower lever 1857 is moved in a clockwise direction about the shaft 1720 by resilient means (not shown). This moves the link 1856 to the right or upwardly from the position shown in FIG. 22 to the position shown in FIG. 23. This pivots the lever 1853 in a clockwise direction about the shaft 1854 so that the lever is moved out of a position in which movement of the hammers 1841–1844 is obstructed. The lever 1853 remains in this position between 230° and 240° of rotation of the main shaft 1073. During this interval, the loaded hammers are released to produce the printing operation. At 240°, the cam 1859 engages the roller 1858 to pivot the lever 1857 in a counterclockwise direction about the shaft 1720 so that the link 1856 is moved to the left or downwardly toward the position shown in FIG. 22. This moves the lever 1853 into engagement with the four rollers 1855 and retracts the hammer slides 1841–1855 to load the compression springs 1850 in anticipation of the next cycle of operation of the cash register.

The hammer assembly includes a controlled latching or pawl assembly that is selectively rendered effective under the control of the printer control unit 1675 to latch in a loaded position only those of the hammers 1841–1844 that are to be used in printing during a given cycle. When these hammers are held in the loaded position by the lever 1853, those of the hammers that are not to be used are not latched and are restored to a normal position by the compressed springs 1850 by gradual movement as the lever 1853 is pivoted clockwise about the shaft 1854 during 185° to 230° of rotation of the main shaft 1073 (see line 2 in FIG. 40).

Figure 21:
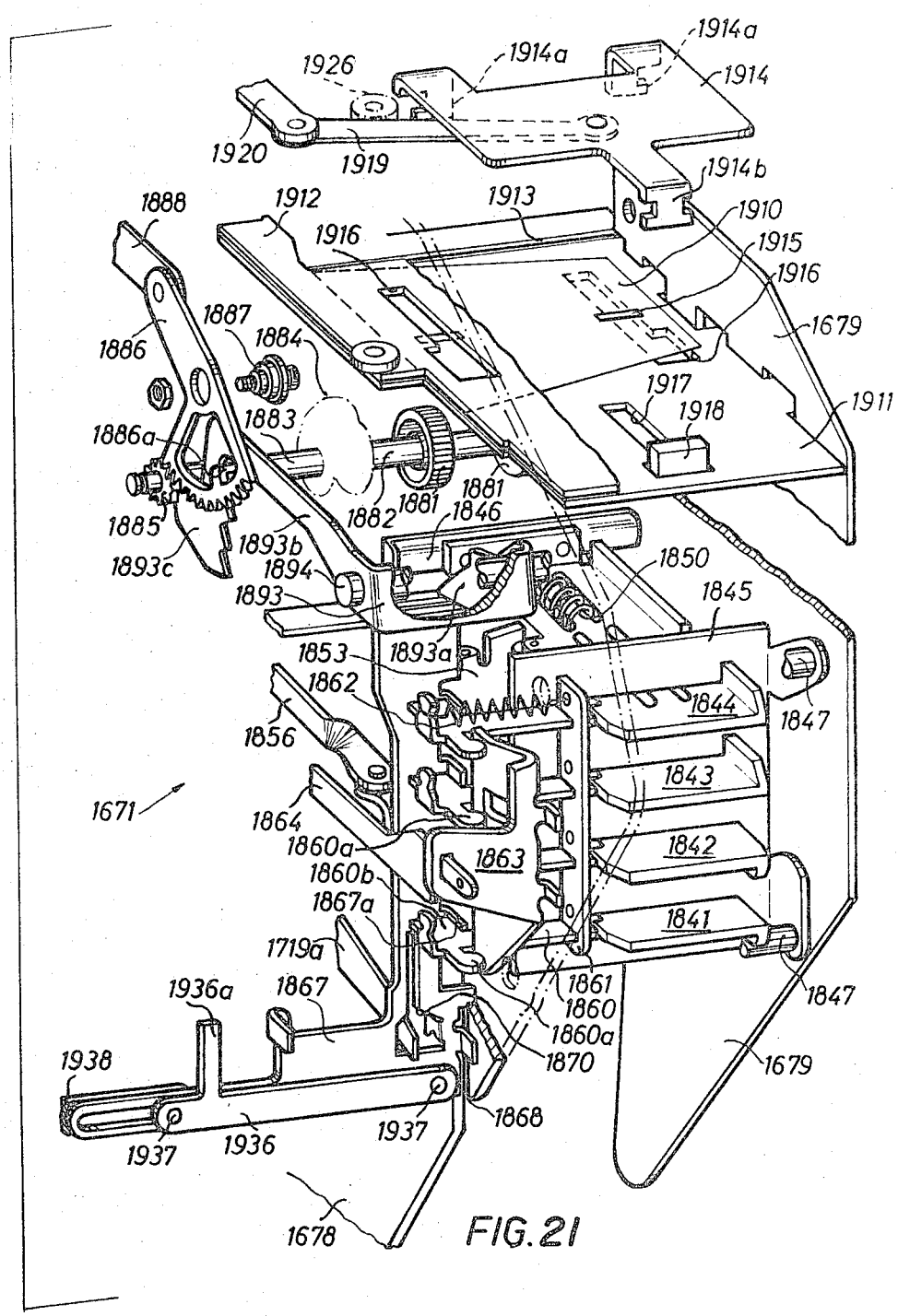
FIGURE 21 is an exploded perspective view of a receipt or ticket printing assembly included in the printing assembly.

The latching assembly includes four latch elements 1860 which are slidably mounted on the supporting element 1845 by an apertured plate 1861 (FIGS. 21–23). A tension spring 1862 connected between the plate 1861 and the latch element 1860 resiliently urges the latch elements 1860 to the right to a position in which they are effective to latch the hammer slides 1841–1844 in a loaded or operative condition. Each of the pawls 1860 is provided with a projecting portion 1860a that is engaged by one of four depending arms 1863a on a plate 1863 that is pivotally mounted in a slot on the frame element 1678. The plate 1863 is provided with a slot in which is received the shouldered portion of a link 1864 (FIGS. 8 and 21–23). The other end of the link 1864 is pivotally connected to an arm on the cam follower lever 1753 by a pivot pin 1865 (FIG. 8).

In the normal condition of the cash register 250, the position of the cam follower lever 1753 is such that the link 1864 bears against the plate 1863 to pivot this plate to the position shown in the figure in which the depending arms 1863a engage the projecting portions 1860a to hold the pawls 1860 in a retracted position against the force of the tension springs 1862. When a cycle of operation of the cash register is initiated, the lever 1753 is maintained in this position until 165° of rotation have been completed (see line 3 in FIG. 40). At this time, the lever 1753 is pivoted in a counterclockwise direction about the shaft 1720 to move the link 1864 downwardly. The tension springs 1862 acting on the pawls 1860 pivot the plate 1863 in a counterclockwise direction about the bearing point on the frame element 1678, and the pawls 1860 are free to move to the right from the position shown in FIG. 22 to the position shown in FIG. 23. In this position, the right end of each of the pawls 1860 is free to move into engagement with a notch 1866 in the edge of each of the hammer slides 1841–1844. However, the selective movement of the pawls 1860 to the right into locking engagement with the slides 1841–1844 is controlled by the printer control unit 1675 so that only the pawls 1860 associated with the ones of the hammer slides 1841–1844 that are to be used in the following printing operation are free to move into locking engagement.

To control this selective movement of the pawls 1860 to positions in which they are effective to latch selected ones of the hammer slides 1841–1844, a control slide 1867 (FIGS. 21–23 and 34) is provided. This slide is slidably mounted in a slot 1868 (FIG. 21) in the frame element 1678 and includes four separate coded portions designated as A–D in FIG. 34 comprising a selectively notched flange portion 1867a. The flange 1867a is interposed between a projecting portion 1860b (FIGS. 22 and 23) on the pawls 1860 and the frame element 1678. Each of the four portions of the flange 1867a is divided into five segments (FIG. 34) corresponding to the five longitudinal positions to which the control slide 1867 can be adjusted by the printer control unit 1675 to produce five different modes of operation of the receipt printing assembly 1671.

If the slide 1867 is positioned with a recess 1868 (FIG. 34) in alignment with the depending portion 1860b (FIGS. 22 and 23), that pawl 1860 is free to move to the right to engage the notch 1866, as shown in FIG. 23, when the plate 1863 is released by the link 1864. Alternatively, if the depending portion 1860b on a pawl 1860 is aligned with the flange 1867a, the release of the plate 1863 permits the depending portion 1860b to move into engagement with the flange 1867a, and this pawl 1860 is not free to move to a condition in which it is effective to latch the related hammer slides 1841–1844 in a loaded condition.

From considering the outline of the flange 1867a illustrated in FIG. 34, it will be seen that when the slide 1867 is disposed in its first and fifth positions, all of the pawls 1860 are latched in their left-hand position by engagement with the flange 1867a and none of the hammers 1841–1844 can be latched in a loaded position. Thus, no information is printed by the receipt printing assembly 1671 when the printer control unit 1675 sets the slide 1867 to its first or fifth positions. The hammer 1841 is effective to record an amount and a total-after-listing consecutive number in the second through fourth settings of the slide 1867, and the hammers 1842–1844 are effective to print the cliché information and the date and time and total-after-reset consecutive number when the slide 1867 is set in the fourth setting.

To permit the slide 1867 to exert this control over the latching of the hammer slides 1841–1844, it is desirable to provide means for shifting or adjusting the setting of this slide during the interval in which all of the pawls 1860 are held in their left-hand positions by the plate 1863 and prior to the time at which these pawls are released for selective movement to the right to their latching positions in which they engage the hammer slides 1841–1844. The actuation of the slide 1867 is controlled by an end portion 1719a (FIGS. 8, 20 and 21) on the cam follower lever 1719 which is received within a slot 1870 in the slide 1867. A tension spring 1871 (FIGS. 22 and 23) connected between the frame and the slide 1867 holds the slide in engagement with the lever 1719a.

The cam follower lever 1719 remains in its normal position until 119° of rotation of the main shaft 1073 have been completed (see line 4 in FIG. 40). At this time, the lever 1719 is pivoted in a counterclockwise direction about the shaft 1720 so that the end portion 1719a of this lever moves upwardly (FIG. 21) to free the slide 1867 to move upwardly from a normal position to one of the five positions determined by the printer control unit 1675. This setting movement is completed by the time the main shaft 1073 has completed 155° of rotation. By a comparison of lines 2, 3 and 4 in FIG. 40, it will be noted that the setting of the slide 1867 is completed prior to the release of the pawls 1860 and prior to the release of the hammer slides 1841–1844. The lever 1719 moves in a clockwise direction about the shaft 1720 to its normal position beginning at 335° of rotation of the main shaft 1073. This restores the slide 1867 to its normal position against the force of the spring 1871 at the end of the cycle of operation of the cash register 250.

After the slide 1867 has been set at 155° of rotation of the main shaft 1073, the pawls 1860 are released by the plate 1063 (see line 3 in FIG. 40) and selectively move to the right in accordance with the ones of the pawls 1860 that are aligned with the notches 1869 in the flanged portion 1867a on the slide 1867. The lever 1853 next moves in a clockwise direction about the shaft 1854 (see line 2 in FIG. 40) so that those of the slides 1841–1844 that are not latched in loaded position are slowly returned to their normal positions. This restoration of the unlocked hammer slides 1841–1844 is completed by the time that 230° of rotation of the main shaft 1073 has been completed (see line 2 in FIG. 40). Beginning at 215° of rotation of the main shaft 1073, the plate 1063 is pivoted in a clockwise direction about its bearing point on the frame element 1678 and, in the interval between 232.5° and 237.5° of rotation of the main shaft 1073 (see line 1 in FIG. 40), this plate has been pivoted sufficiently to move the latches 1860 which engage the hammers 1841–1844 sufficiently to the left that the previously locked hammer slides are released. This permits the compression springs 1850 to drive the previously latched ones of the slides 1841–1844 forwardly against the paper tape and ribbon to force these elements against the selected ones of the printing means in the printing wheel assembly 1670 to cause the printing of the selected information. As described above, the pawls are returned to their normal positions and the cocking of the hammer slides 1841–1844 is initiated during the remaining portion of the cycle of operation of the cash register 250 (see lines 2 and 3 in FIG. 40).

To provide means for feeding the paper tape from the roll 1673 through different distances relative to the hammers 1441–1444 in dependence on the type of recording operation being performed, the free end of the paper tape passes between a pair of spring biased pressure rollers 1880 (FIG. 6) and a pair of controllably driven feed rollers 1881 (FIGS. 6 and 21). The driven rollers 1881 are secured to a shaft 1882 that is rotatably mounted between the frame element 1678 and portions of the support 1846 immediately above the hammer slide 1844. A suitable one-way pawl and ratchet assembly 1883, shown schematically in FIG. 21, is interposed between the shaft 1882 and a shaft 1883 and is operable to transmit only counterclockwise movement to the feed rollers 1881 (FIG. 6). The shaft 1883 is rotatably mounted on the frame element 1677 and a portion of the support 1846 and carries a gear 1885 that is disposed adjacent the frame element 1677.

To provide means for rotating the shaft 1883, a gear segment 1886, which is pivotally mounted on the frame element 1677 by a shouldered hub 1887, meshes with the gear 1885 and is pivotally connected at its upper end to a link 1888. The other end of the link 1888 is pivotally connected to the upper end of a cam follower lever 1889 (FIGS. 7 and 8) which is pivotally mounted on the shaft 1821. The lower end of the cam follower lever 1889 carries a roller 1890 that is resiliently biased into engagement with the outer periphery of a cam 1891 that is keyed to the sleeve 1688 by a tension spring 1892 which is connected between the frame and the upper end of the cam follower lever 1889.

When the cash register 250 is placed in operation, the first 165° of rotation of the main shaft 1073 does not affect the operation of the tape feeding means for the receipt printing assembly 1671 (see line 6 in FIG. 40). However, after 165° of rotation, the spring 1892 is enabled to pivot the lever 1889 in a clockwise direction about the shaft 1821 so that the link 1888 moves to the right. This pivots the gear segment 1886 in a clockwise direction about the shaft 1887 and drives the gear 1885 and the shaft 1883 in a counterclockwise direction (FIG. 21) to rotate the rollers 1881 in a counterclockwise direction (FIG. 6) through the one-way drive assembly 1884.

In the interval between 195° and 230° of rotation of the main shaft 1073, the cam follower roller 1890 engages a protuberance 1891a (FIG. 8) on the cam 1891 which pivots the lever 1889 in a counterclockwise and then a clockwise direction to produce a left-hand and then right-hand directed movement of the link 1888. This first movement drives the gear 1885 and the shaft 1883 in a clockwise direction, but this motion is not transmitted through the assembly 1884. The second portion of this movement drives the gear 1885 and the connected shaft 1883 in a counterclockwise direction which is transmitted through the assembly 1884 to rotate the rollers 1881 in a counterclockwise direction (FIG. 6). The protuberance 1891a (FIG. 8) has the effect of increasing the amount of movement of the rollers 1881 that can be obtained with a gear segment 1886 of a given size.

In the interval between 252° and 315° of rotation of the main shaft 1073 (see line 6 in FIG. 40), the cam 1891 pivots the lever 1889 against the action of the spring 1892 in a counterclockwise direction about the shaft 1821 to restore the gear segment 1886 to its normal position. During this return movement, the clockwise rotation of the gear 1885 and the shaft 1883 is not transmitted to the shaft 1882 by the assembly 1884. Thus, by rotating the rollers 1881 in the interval between 165° and 230° of rotation of the main shaft 1073, the tape in the receipt printing assembly 1671 is advanced pior to the operation of the printing hammer slides 1841–1844 (compare lines 1 and 6 in FIG. 40).

The degree of movement imparted to the drive rollers 1881 during any given cycle of operation of the cash register 250 is controlled by the printer control unit 1675 by selectively limiting the movement of the gear segment 1886 in a clockwise direction about the shaft 1887 under the control of the tension spring 1892. This control is exercised by a generally U-shaped yoke 1893 which is pivotally mounted on a shaft 1894 (FIG. 3B) carried between the frame elements 1677 and 1678. A depending arm 1893a (FIGS. 3B and 8) on the yoke 1893 is disposed immediately adjacent the wall element 1678 and is resiliently biased into engagement with the upper end of the control slide 1867 by a tension spring 1895 that is connected between a second arm 1893b and the frame element 1677, the arm 1893b being disposed adjacent the frame element 1677. Thus, when the slide 1867 (FIGS. 25 and 26) is moved upwardly to one of the five positions selected by the printer control unit 1675, the yoke 1893 as set in a corresponding position by being pivoted in a clockwise direction about the shaft 1894 from the normal position shown in FIG. 25 to any one of the four remaining positions, such as the one shown in FIG. 26, corresponding to the selected setting of the printer control unit 1675.

To control the setting of the gear segment 1886 in accordance with the setting of the yoke 1893, the arm 1893b is provided with a further depending portion 1893c (FIGS. 25, 26 and 36) which is disposed adjacent the gear segment 1866 and is adapted to engage a projection or lug 1886a on the gear segment 1886 (FIGS. 3B, 25 and 26). As indicated in FIG. 36, the yoke 1893 can be set to five spaced positions corresponding to five settings of the printer control unit 1675, and the right-hand edge of the depending arm 1893c includes a plurality of steps or shoulders which engage the lug 1886a after four different lengths of movements identified as "a," "b," "c," and "d."

If the yoke 1893 remains in its normal position shown in FIG. 25 corresponding to the first or normal position of the printer control unit 1675, the lug 1886a is disposed immediately adjacent the arm 1893c and the gear segment 1886 is locked against any movement in a clockwise direction about the shaft 1887. Thus, the feed rollers 1881 cannot be moved when the link 1888 is freed by the lever 1889 for movement by the tension spring 1892. If the yoke 1893 is set to its second position, the lug 1886a is aligned with the first shoulder on the arm 1893c, indicated by "2" in FIG. 36, and the gear segment 1886 can be moved a single unit of movement in a clockwise direction about the shaft 1887 so that the drive rollers 1881 advance the paper tape through six mm. of movement. If the yoke 1893 is advanced to its third setting by movement in a clockwise direction about the shaft 1894, the lug 1886a is aligned with the lowest shoulder on the arm 1893c, indicated by a "3," and the gear segment 1886 can move in a clockwise direction about the shaft 1887 to produce a twelve mm. movement of the paper tape. If the yoke 1893 is pivoted in a clockwise direction about the shaft 1894 to the fourth or fifth positions, indicated by "4" and "5" in FIG. 36, the "d" movement which comprises a full ticket or receipt feed is performed because the lug 1886a is not aligned with the depending arm 1893c, and a full clockwise rotation of the gear segment 1886 can take place. It is during this full feeding movement that the extra feeding movement provided by the protuberance 1891a is used.

During a cycle of operation of the cash register 250, the setting of the slide 1867 is completed following 155° of rotation of the main shaft 1073 (see line 4 in FIG. 40). The cam follower lever 1889 does not free the link 1888 for movement by the tension spring 1892 until after 165° of rotation of the main shaft 1073 has been completed (see line 6 in FIG. 40). Thus, the yoke 1893 is set to an adjusted position selected by the printer control unit 1675 to select the increment of movement to be imparted to the paper tape by the feed rollers 1881 prior to the time at which an attempt is made to pivot the gear segment 1886 in a clockwise direction about the shaft 1887. In this manner, the paper tape supplied by the roll 1673 is advanced through different increments of movement in dependence on the setting of the printer control unit 1675. The different lengths of the paper tape fed provides means for spacing the end of a receipt and for separating various amounts on the receipts, such as separating listing entries from a total entry.

As indicated above, the receipt printing assembly 1671 includes a slack producing means for pulling tape from the roll 1673 so as to provide a free loop of tape from which paper tape can be advanced by the drive rollers 1881. This slack producing means includes an arm 1896

(FIG. 6) that is moved upwardly through a slot 1897 in the frame element 1678 in a portion of the path of movement of the paper tape located between the entrance of the tape guide 1840 and a paper guide pin 1898. When the arm 1896 moves upwardly from the normal position disposed beneath the paper tape shown in FIG. 6 in solid outline to the elevated position shown in dot and dash outline in this figure, a loop of tape indicated in dot and dash is produced from which the driven rollers 1881 can advance the tape without having to apply the force necessary to rotate the roll of tape 1673.

The arm 1896 is secured to two spaced arms 1899a and 1899b of a bracket 1899 (FIGS. 3B, 7, 8 and 24) which are connected by a bight portion 1899c. The other ends of the arms 1899a and 1899b are pivotally mounted on a shaft 1900 that is carried on the frame elements 1677 and 1678. A helical spring 1901 (FIG. 24) disposed about the shaft 1900 and between the arms 1899a and 1899b includes one end portion 1901a which bears against the bight portion 1899c of the bracket 1899 and another end portion 1901b which bears against a lug 1902a on a cam follower element 1902 that is rotatably mounted on the shaft 1900. The cam follower element 1902 carries a roller 1903 which is resiliently biased into engagement with the outer periphery of the cam 1681 by the helical spring 1901.

When the cash register 250 is placed in operation, the cam 1681 is rotated in a clockwise direction about the shaft 1683 and pivots the cam follower member 1902 in a counterclockwise direction about the shaft 1900 in the interval between 5° and 180° (see line 5 in FIG. 40). The lug 1902a engages the projecting portion 1901b and forces the helical spring 1901 in a counterclockwise direction about the shaft 1900. This forces the end 1901a (FIG. 3B) against the bight portion 1899c on the bracket 1899 and pivots the bracket 1899 in a counterclockwise direction about the shaft 1900. This moves the arm 1896 upwardly within the slot 1897 to pull a length of tape from the roll 1673. The helical spring 1901 restores the bracket 1899 and the arm 1896 carried thereon to a normal position during between 180° and 290° of rotation of the main shaft 1073 (see line 5 in FIG. 40). A rod or shaft 1904 carried by the frame elements 1677 and 1678 engages the lower edges of the arms 1899a and 1899b to limit clockwise rotation of the bracket 1899 about the shaft 1900 under the influence of the helical spring 1901.

The severing means for cutting off the printed end portion of the paper tape at the proper point in the recording program of the cash register 250 is positioned immediately above the drive rollers 1881 and spaced from the hammer slides 1841–1844. The severing assembly includes a cutting blade 1910 (FIGS. 21 and 27) which has a tapered edge and which is slidably mounted between a lower supporting plate 1911 and an upper supporting plate 1912. These plates, which are secured between the frame structures 1678 and 1679, define a throat or opening 1913 through which the paper tape extends. A member 1914 disposed above the top supporting plate 1912 includes a pair of forward depending portions 1914a which are received within slots 1915 in the cutting blade 1910 and which are slidably received in elongated openings 1916 in the plates 1911 and 1912. A rear depending portion 1914b on the member 1914 is slidably received within a pair of aligned slots 1719 in the plates 1911 and 1912 and is adapted to engage a resilient bumper 1918 to cushion movement of the blade 1910 away from the cutting position.

To provide means for actuating the cutting blade 1910, a link 1919 is pivotally connected at one end to the member 1914 and at its other end to a link 1920 (FIG. 27). The other end of the link 1920 is connected to an upwardly extending arm 1921a on a cam follower lever 1921. The lever 1921 is pivotally mounted on the shaft 1821 and carries a pair of rollers 1922 and 1923 that are adapted to engage the outer peripheries of a pair of cams 1924 and 1925, respectively, that are keyed to the sleeve 1688.

The severing assembly or the blade 1910 is selectively rendered effective to cut the paper tape to provide a discrete receipt or ticket in only selected ones of the modes of operation of the cash register 250. This control is exerted by the printer control unit 1695 through the yoke 1893. As set forth above, the yoke 1893 can be set in five positions under the control of the printer control unit 1675. The link 1919 extends through an opening in the supporting frame 1678 immediately adjacent the arm 1893 (FIGS. 25 and 26) on the yoke 1893. This arm is provided with a shouldered portion, as indicated schematically in FIG. 36, which is moved to an effective position when the yoke 1893 is advanced to its fourth or fifth setting. The arm 1893a selectively provides a fulcrum about which the link 1919 can pivot to actuate the blade 1910.

When a cycle of operation of the cash register 250 is initiated and following the setting of the slide 1967 and the yoke 1893 to a position selected by the printer control unit 1675, the cams 1924 and 1925 engage the rollers 1922 and 1923 to pivot the lever 1921 in a clockwise direction about the shaft 1821. This takes place between 320° and 335° of rotation of the main shaft 1073 (see line 7 in FIG. 40) and prior to the resetting of the slide 1867 and the yoke 1893 (see line 4 in FIG. 40). When the lever 1921 is pivoted in a clockwise direction, the link 1920 moves to the right. If the yoke 1893 is set in a first, second or third position indicated by the characters "1," "2," and "3" in FIG. 36, the arm 1919 pivots about the axis of its connection to the member 1914 and moves from the position shown in dot and dash outline in FIG. 25 to the position shown in solid outline. Thus, the cutting blade 1910 is not actuated.

Alternatively, if the yoke is pivoted in a clockwise direction about the shaft 1894 to the fourth or fifth position, which latter position is illustrated in FIG. 26, the movement to the right of the link 1920 (FIG. 27) moves the right-hand edge of the link or arm 1919 into engagement with the arm 1893a on the yoke and this point of engagement serves as a fulcrum about which the arm 1919 pivots in a counterclockwise direction. This moves the member 1914 and the connected blade 1910 downwardly and to the left (FIG. 27) in the interval between 320° and 335° to sever the paper tape. During the continuing rotation of the cams 1924–1925 in the interval from 348° to 358°, the links 1919 and 1920 and the cutting blade 1910 are restored to their normal positions. During this movement, the left-hand edge of the arm 1919 engages a washer 1926 carried on the plates 1911 and 1912 which serves as a fulcrum to pivot the link 1919 in a clockwise direction to retract the blade 1910.

If desired, the arm 1893a on the control yoke 1893 can be provided with a shouldered surface which is spaced closer to the shaft 1894 and which will engage the link or arm 1919 to provide substantially half of the pivotal movement of this arm that is provided when the shoulder on the arm 1893a is engaged in the fourth and fifth settings of the yoke 1893. When the arm 1919 is pivoted only half of its normal distance, the cutting blade 1910 is operated to only partially sever the paper tape. When the paper tape is subsequently and completely severed incident to a subsequent recording operation, the partially severed portion of the paper tape can provide a detachable check.

The severing means including the cutting element 1910 is so positioned relative to the hammer slides 1841–1944 that when the tape is advanced through a full ticket feed in the fourth and fifth settings of the yoke 1893, the knife or cutting element 1910 severs the paper tape between the material recorded by the two clichés and the hammers 1842 and 1843. This means that the first item on a receipt comprising the information from the lower clichés struck by the hammer 1842 and the lower line of type wheel struck by the hammer slide 1841 was actually recorded at the end of a preceding cycle of operation. In other words, the hammers 1843 and 1844 record the last or bottom items of information on the receipt in any given cycle of operation at the same time the hammers 1841 and 1842 are recording the items of information to appear at the top of the next following receipt or ticket.

The receipt printing assembly 1671 and the audit strip printing assembly 1672 are so oriented relative to the housing 268 (FIG. 1) of the cash register 250 that all of the information pertaining to all of the items in a given transaction can be visibly inspected during the operation of the cash register. More specifically, the information recorded by the hammer 1808 from the top line of type wheels in the type wheel assembly 1670 occupies the portion of the paper tape from the roll 1675 that extends horizontally from the type wheel assembly 1670 to the drive roller 1800. All of the information recorded on this portion of the tape supplied from the roll 1675 is visible through the window 274 (FIG. 1) in the cover 268 for the printing assembly 266. As soon as any given item recorded on the audit strip passes around the drive roller 1800 so that it is not visible through the window 274, the corresponding item recorded on the paper tape from the roll 1673 for the receipt or strip emerges from the outlet 272 in the housing 268 (FIG. 1). The information pertaining to the last transaction recorded by the cash register 250 is displayed by the indicating assembly. In this manner, the last item is displayed by the indicating assembly 260, the next group of items is visible through the window 274 on the audit strip, and the most remote or first recorded information is visible on the end of the receipt discharged from the outlet 272.

*Printer control unit 1675.*—The printer control unit is controlled by the account bank 277, the mode of operation bank 280 and the lock bank 281 to control the recording of different items of information by and the recording format of the receipt printing assembly 1671. To provide this control, the printer control unit 1675 includes six coded elements 1930–1935 (FIGS. 3B, 5B, 28 and 31) which are set through the telescoping shaft 1358 from the mode of operation differential assembly 258 and concurrently with the setting of the coding element 1236. The coded members 1930–1935 control the setting of the slide 1867 and are individually rendered effective to control the setting of this slide under the control of the unit 1675. The coded discs 1930–1932 are used to control operations of the printing assembly 266 when no receipts are to be provided by this assembly. The coded elements 1933–1935 are used to control the operation of the printing assembly when receipts are to be printed. A selected one of the discs in either of the groups 1930–1932 and 1933–1935 is selected in accordance with the setting of the account differential assembly 258.

FIGS. 37 and 38 of the drawings illustrate the outlines of two of the coded members 1934 and 1935 in the receipt group. The right-hand portion or edge of each of these two members can be divided into five levels representing the five different programs that can be selected by the unit 1675. Further, the right-hand portion of each of the members 1930–1935 is divided into eleven segments corresponding to the eleven settings of the mode of operation differential assembly 258.

To provide means for sensing or detecting the coded edges of the members 1930–1935, a slide 1936 (FIGS. 21 and 31) is slidably mounted on the slide 1867 by two headed fasteners 1937 which extend through elongated slots formed in the slide 1867. The left-hand fastener 1937 (FIG. 21) is secured to the right end of a link 1938. This link is set in one of six spaced positions to place a sensing or detecting projection 1936a on the slide 1936 in alignment with one of the six coded members 1930–1935. When this setting operation has been performed, the lever 1719 releases the slide 1867 for movement by the spring 1871 (see line 4 in FIG. 40). The tension spring 1871 moves the slide 1861 upwardly until the upper end of the projection 1936a engages the edge of one of the members 1930–1935 at one of the five levels.

As an example, if the mode of operation differential assembly 258 has been adjusted to its ninth position, and the link 1938 has been displaced to move the slide 1936 relative to the slide 1867 to a position in which the projection 1936a is aligned with the member 1935, the slide 1936 and the slide 1867 to which it is connected move inwardly and upwardly until the end of the projecting portion 1936a engages the edge at the second level. This means that the slide 1867 is adjusted to its second position in which only the uppermost hammer slide 1844 is free to move to a latching position. In this position, the yoke 1893 is also pivoted so that the arm 1919 does not engage the arm 1893a, and the severing means are ineffective. Further, the first shoulder on the arm 1893c is engaged by the projecting lug 1868a on the gear segment 1886 to permit a six mm. advance of the paper tape.

Alternatively, if the slide 1936 has been adjusted to a position in which the projecting portion 1936a is aligned with the member 1934 with the mode of operation differential assembly still adjusted to its ninth setting, the connected slides 1867 and 1936 are moved by the tension spring 1871 to their third setting before projection 1936a engages the third level edge on the member 1934 (FIG. 37). In this position, the severing means are still disabled because the arm 1919 cannot be moved into engagement with the arm 1893a on the yoke 1893, and the second shoulder on the arm 1893c of the yoke 1893 is engaged by the lug 1886a to permit the gear segment 1886 to advance the paper tape through a twelve mm. movement. In this manner, the slide 1867 is moved to one of five settings in accordance with the level of the edge on the selected coded members 1930–1935 engaged by the projecting portion 1936a on the slide 1936.

The link or slide 1938 is set in one of six longitudinally spaced positions in order to set the projection 1936a in alignment with one of the six coded members 1930–1935. To accomplish this, the left end of the link 1938 is connected to a slide 1939 (FIGS. 28–30) that is slidably mounted on a supporting plate 1940 by a pair of headed fasteners 1941 that are carried on the member 1940 and extend through slots 1942 in the slide 1939. The plate or member 1940 is secured to a rod or bar 1943 forming a part of the main frame of the cash register 250. The slide 1939 is normally urged to the right by a tension spring 1944 connected between the slide 1939 and the main frame of the cash register. A second slide 1945 (FIG. 30) is mounted on the slide 1939 by a pair of fasteners 1946 which are secured to the slide 1939 and which extend through a pair of slots 1947 in the slide 1945.

To control the connection between the slides 1939 and 1945, a lever 1948 is pivotally mounted on the slide 1945 by a pivot pin 1949 and includes an L-shaped recess 1950 in which is disposed a pin 1951 that is carried on the slide 1939 and extends through an opening 1952 in the slide 1945. The lever 1948 is normally urged to the position shown in FIG. 30 by a tension spring 1953 that is connected between the lever 1948 and an upper projection 1945a on the slide 1945. When the lever 1948 is in the position shown in FIG. 30 corresponding to a condition in which no receipts are to be printed, the link 1938 and the connected slide 1939 can be moved by the spring 1944 to dispose the projection 1936a in alignment with one of the three left-hand or no-receipt coded members 1930–1932. When the lever 1948 is pivoted in a clockwise direction about the pin 1949, the pin 1951 is placed in alignment with the elongated portion of the L-shaped slot 1950, and the pins 1946 move to the right ends of the slots 1947 to move the link 1938 and the slide 1936 to a position in which the projecting portion 1936a can be disposed in alignment with one of the three right-hand or receipt control members 1933–1935.

To provide means for shifting the position of the lever 1948, a lever 1954 (FIGS. 28 and 33) is pivotally mounted on the frame element 961 by a stub shaft 1955. This lever carries a pin 1956 that is disposed adjacent the lower ends of two levers 1957 and 1958 which are pivotally mounted on the frame element 961 by a pivot pin 1959. The upper end of the lever 1957 is received within a notch or recess 940 in a no-receipt slide 922 (FIG. 33). The upper end of the lever 1958 is received within a notch or recess 939 in a slide 921.

Whenever the keys in the lock bank 281, including the no-receipt key 308, are not operated, the slides 921 and 922 are held in the positions shown in FIG. 33 and the levers 1957 and 1958 are also held in the positions shown in FIG. 33 in which their ends are spaced from the pin 1956 on the lever 1954. This permits the lever 1948 to remain in its normal position shown in FIG. 30 in which the slides 1945 and 1939 are connected. As described above, this permits the link 1938 to position the projection 1936a on the slide 1936 in alignment with one of the three left-hand or no-receipt coded members 1930–1932. The configuration of these three members is circular and prevents the operation of the receipt printing assembly 1671. However, the edges of these three members can be notched to provide different types of receipts during a no-receipt operation, if desired.

Alternatively, if the slides 921 and 922 are moved to their set positions when the key 308 or any of the other keys in the lock bank 281 are operated, one of the levers 1957 and 1958 is pivoted in a counterclockwise direction about the shaft 1959 from the position shown in FIG. 33 to engage the pin 1956 and pivot the lever 1954 in a counterclockwise direction about the shaft 1955 so that the left end of the lever 1948 is raised. This pivots the lever 1948 in a clockwise direction (FIG. 30) about the pivot pin 1949 so that the pin 1951 is disposed in the elongated leg of the L-shaped slot 1950. At this time, the tension spring 1944 moves the slide 1939 to the right relative to the slide 1945 so that the link 1938 shifts the slide 1936 to its right-hand position in which the projection 1936a can be disposed in alignment with one of three right-hand coded members 1933–1935 that control the printing assembly 266 to produce receipts. Thus, the lock bank 281, including the no-receipt key 308, controls the printer control unit 1675 to select one of the two groups of coded members 1930–1932 and 1933–1935 in accordance with whether receipts are or are not to be produced.

The printer control unit 1675 is controlled by the account differential assembly 258 to select a desired one of the three coded elements in each of the three groups 1930–1932 and 1933–1935. As described above, the setting of the amount differential assembly 258 results in the adjustment of a plate or disc 1362 (FIGS. 5A and 28–30) to a position corresponding to the setting of the account differential assembly. A coded member 1960 is secured to the disc 1362 by a plurality of fasteners 1961 and a tongue 1362a on the disc 1362. The disc 1960 (FIG. 35) has its periphery divided into ten sectors corresponding to the ten settings of the account differential assembly 258, and each of these sectors can be provided with an edge portion of one of three levels identified as "I," "II," and "III." The coded outer periphery of the member 1960 selects one of the three coded members in the two groups 1930–1932 and 1933–1935 by controlling the movement of the slide 1945.

More specifically, the slide 1945 is provided with an upper shoulder 1945b (FIG. 30) and a lower shoulder 1945c, both of which are formed on the projecting portion 1945a. The slide 1945 also includes an outwardly projecting lug or flange 1945e which is disposed within a recess 1963 (FIG. 28) in a stop member 1964 that is secured to the plate 1940. When the slide 1939 is moved to the right by the spring 1944, the shoulder 1945c first looks for the presence of a projection extending to the level "I" on the coded member 1960 which is adjusted to the position corresponding to that of the account differential assembly 258. If the shoulder 1945c engages the coded element 1960, the movement of the slides 1939 and 1945 to the right is arrested with the projection 1936a positioned in alignment with either the coded element 1930 or the coded element 1933. It will be positioned in alignment with the element 1930 if the lever 1945 is in its normal position representing a no-receipt operation. Alternatively, the lug 1936a will be disposed in alignment with the coded element 1933 if the lever 1945 has been deflected to permit the position of the slide 1945 to be moved to the left relative to the slide 1939.

The shoulder 1945b next checks for the presence of level "II" projection on the member 1960 in the event that the shoulder 1945c is not stopped by the member 1960. If the shoulder 1945b engages a projection on the level "II" on the member 1960, the link 1938 positions the projection 1936a in alignment with one of the coded elements 1931 or 1934 in dependence on the position of the lever 1948. Finally, if the shoulders 1945b and 1945c do not engage any projections on the member 1960, i.e., this member is adjusted to the position in which its edge is recessed to the lever "III," the flange 1945e engages the stop member 1964 at the right end of the recess 1963 (FIG. 28), and the link 1938 positions the projection 1936a in alignment with the third member 1932 or 1935 in dependence on the setting of the lever 1948. In this manner, the setting of the account differential assembly 258 by the selective positioning of the coded element 1960 controls the selection of one of the three coded members in each of the groups 1930–1932 and 1933–1935.

To provide means for shifting the slides 1939 and 1945 into and out of a sensing position so as to permit the setting of the coded element 1960, a lever 1965 (FIG. 28) is pivotally mounted on the plate 1940 by a shouldered fastener 1966. The lower end of the lever 1965 bears against a flange 1939a on the slide 1939, and the other end of the lever 1965 is disposed above the upper end of a link 1967 (FIGS. 28 and 32) that is slidably mounted on the frame element 961 by a pair of shouldered fasteners 1968 which pass through elongated slots 1969 formed in two flanged portions 1967a on the link 1967. The lower end of the link 1967 is pivotally connected to a lever 1970 which is pivotally mounted on a shaft 1971 extending between a generally triangular supporting plate 1972 and the frame element 961. The free end of the lever 1970 is disposed adjacent a cam 1072 (FIG. 32) secured to the main shaft 1073 in the path of movement of a projection 1072a thereon.

When a cycle of operation of the cash register 250 is initiated, the cam 1072 is rotated in a counterclockwise direction (FIG. 32), and the projecting portion 1072a engages the lever 1970 to pivot this lever in a clockwise direction about the shaft 1971. This moves the link 1967 upwardly so that its upper edge engages the adjacent arm of the lever 1975 and pivots this lever in a clockwise direction about the shaft 1966. This moves the lower end of the lever 1965 to the left (FIG. 28), so that it bears against the lug 1939a and moves the slide 1939 together with the slide 1945 and the lever 1948 to the left. This movement takes place between 3° and 20° of rotation of the main shaft 1073 (see line 11 in FIG. 40). With the slides 1939 and 1945 displaced to the left, the mode of operation and account differential assemblies 258 can be freely adjusted to their new settings.

After the setting of the mode of operation and the account differential assemblies 258 has been completed, the protuberance 1072a on the cam 1072 moves beyond the end of the lever 1970, and the tension spring 1944 shifts the slides 1939 and 1945 to the right and restores the lever 1965 and the link 1967 to their normal positions (FIG. 32). The tension spring 1944 is effective to shift the link 1938 to a position determined by the position of the lever 1948, which was set prior to the initiation of the cycle of operation, and the setting of the account differential assembly 258. This sets the projection 1936a on the slide 1936 in alignment with the selected one of the six coded members 1930–1935. When the cam follower lever 1719 is then operated to free the slide 1867 for movement by the spring 1871, the projection 1936a is moved inwardly toward the selected one of the coded elements 1930–1935 to set the slide 1867 in one of five positions determined by the coded program on the periphery of one of the members 1930–1935 in the setting selected by the mode of operation differential assembly 258.

Although the present invention has been described with reference to a particular embodiment thereof, it should be understood that many other modifications and embodiments can be devised by those skilled in the art that will fall within the spirit and scope of the principles of this invention.

What is claimed as new and is desired to be secured by Letters Patent of the United States is:

1. In an accounting machine, a plurality of differential means operable to different data representing positions; a recording assembly for recording data on a record in a plurality of different formats, said recording assembly being supplied with at least part of the data to be recorded from said differential means; a plurality of coded means for controlling the recording assembly to provide the desired formats, each of said coded means representing a given recording format; and control means controlled by at least one of said differential means for selecting one of said coded means and for rendering the selected coded means effective to control the recording assembly.

2. The accounting machine set forth in claim 1 in which the recording assembly includes first and second recording means, in which means are provided for adjusting the coded means to different settings in accordance with the position of another one of said differential means, and in which the control means controls the operability of the first recording means in accordance with the selection of one of the coded means and controls the operability of the second recording means in dependence on the selection of one of the coded means and the setting to which the selected coding means has been adjusted.

3. The accounting machine set forth in claim 2 in which the control means includes manually operable means for disabling operation of the first recording means.

4. In an accounting machine, a plurality of differential means operable to different data representing positions; recording means operated by at least some of said differential means to record data on a record element, said recording means also including controllable feeding means for moving said record element different distances and controllable cutting means for cutting said record element; a plurality of coded elements each providing a different program of record feeding, cutting, and recording operations; control means controlled by said control elements for controlling the operation of the recording means including the feeding means and the cutting means; and means controlled by at least one of said differential means for selecting one of said control elements to control said control means.

5. In an accounting machine, a plurality of differential means operable to different data representing positions; a recording assembly for recording data on a record in a plurality of different formats, said recording assembly being supplied with at least part of the data to be recorded from said differential means; a plurality of coded means for controlling the recording assembly to provide the desired formats, each of said coded means representing a given recording format; means for adjusting said plurality of coded means to a position corresponding to the setting of one of said differential means; and means controlled by another one of said differential means for rendering a selected one of said coded means effective to control the recording assembly.

6. In an accounting machine, a plurality of differential means operable to different data representing positions; a recording assembly for recording data on a record in a plurality of different formats, said recording assembly being supplied with at least part of the data to be recorded from said differential means; a plurality of coded means for controlling the recording assembly to provide the desired formats, each of said coded means representing a given recording format, manually operable means for selecting one group of said coded means; and means controlled by one of said differential means for rendering a selected one of the coded means in said selected group effective to control said recording assembly.

7. In an accounting machine, a plurality of differential means operable to different data representing settings; a recording assembly including first recording means controlled by at least some of said differential means to record data corresponding to the settings of the differential means and second recording means for recording other data, said recording assembly also including both a controllable feeding means for moving a record relative to said first and second recording means and a controllable cutting means for cutting said record; a plurality of coded means each representing a recording program to be performed by said recording assembly, said recording program including the recording of data by selected ones of said first and second recording means, the controlled advance of the record by the feeding means, and the controlled cutting of said record by said cutting means; sensing means responsive to the coded means for controlling the recording assembly to perform the recording program represented by the coded means; and means controlled by the setting of at least one of said differential means for rendering a selected one of the coded means effective to control said sensing means.

8. In an accounting machine, a plurality of differential means operable to different data representing settings, a recording assembly including first recording means controlled by at least some of said differential means to record data corresponding to the settings of the differential means and second recording means for recording other data, said recording assembly also including both a controllable feeding means for moving a record relative to said first and second recording means and a controllable cutting means for cutting said record; a plurality of coded means each representing a recording program to be performed by said recording assembly, said recording program including the recording of data by selected ones of said first and second recording means, the controlled advance of the record by the feeding means, and the controlled cutting of said record by said cutting means; sensing means responsive to the coded means for controlling the recording assembly to perform the recording program represented by the coded means; means for adjusting said plurality of coded means to different positions in dependence on the setting of one of said differential means; and means controlled by the setting of another one of said differential means for rendering a selected one of said coded means effective to control said sensing means.

9. In an accounting machine, a plurality of differential means operable to different data representing settings; a recording assembly including first recording means controlled by at least some of said differential means to record data corresponding to the settings of the differential means and second recording means for recording other data, said recording assembly also including both a controllable feeding means for moving a record relative to said first and second recording means and a controllable cutting means for cutting said record; a plurality of coded means each representing a recording program to be performed by said recording assembly, said recording program including the recording of data by selected ones of said first and second recording means, the controlled advance of the record by the feeding means, and the controlled cutting of said record by said cutting means; sensing means responsive to the coded means for controlling the recording assembly to perform the recording program represented by the coded means; means for adjusting the plurality of coded means to a position corresponding to the setting of one of said differential means; manually adjustable means; means controlled by said manually adjustable means for selecting one group of said coded means; and means controlled by another one of said differential means for rendering a selected one of the coded means in said selected group of coded means effective to control said sensing means.

10. In an accounting machine, a plurality of differential means operable to different data representing settings, a plurality of first recording means operable to corresponding settings by at least some of said differential means, second recording means spaced from said first recording means, a plurality of separately operable hammer means disposed in alignment with and spaced from said first and second recording means, means including a single coded element for feeding a length of record elements between said hammer means and said first and second recording means, drive means for operating said hammer means to force said record element against said recording means, and means operable to different settings under the control of at least one of said differential means for rendering said drive means effective to operate different combinations or individual ones of said hammer means.

11. In an accounting means including a plurality of differential means, a plurality of different type means for recording data on a record, at least some of said type means being adjustable to settings under the control of said differential means, a plurality of hammer means for forcing said record against said type means, resilient means individual to each of said hammer means for operating said hammer means, latching means for holding said hammer means in a loaded position in which the related resilient means is compressed, and control means controlled by at least one of said differential means for selectively rendering said latching means effective to hold different ones of said hammer means in loaded position.

12. The accounting means set forth in claim 11 in which said control means includes a slide having a coded detent portion for controlling the operability of said latching means.

13. In an accounting machine, a plurality of differential means operable to different data representing positions, a plurality of type means operated to corresponding positions by at least some of said differential means, hammer means for moving a record against said type wheels, resilient means for operating said hammer means, latching means for holding said hammer means in a loaded position in which said resilient means is stressed, feed means for moving said record relative to said type wheels, linkage means for operating said feed means, means in said linkage means for moving said hammer means to stress said resilient means and for releasing said latching means to permit said resilient means to operate said hammer means, drive means for operating said machine through a cycle of operation and for moving said linkage means during each cycle of operation, and control means controlled by at least one of said differential means for preventing movement of said linkage means during certain of said cycles of operation in accordance with the setting of said one differential assembly.

14. In an accounting machine, a plurality of differential means successively operable to different data representing positions, recording means controlled by at least one of said differential means to record corresponding data on a length of record element, record element feeding means for moving said record element relative to said recording means, said feeding means including a resiliently operated drive element, stop means movable into engagement with said drive element to permit different amounts of movement of said drive element, means controlled by at least one of said differential means for controlling the position of said stop means relative to said drive element, cutting means for severing said record element, and means controlled by said stop means for rendering said cutting means effective to sever said record element when said stop means is in one of its positions and for rendering said cutting means ineffective when said stop means is in another of its positions.

15. In an accounting machine, a plurality of differential means operable to different data representing positions, recording means controlled by at least one of said differential means for recording corresponding data on a length of a record element, a cutting element for severing an end portion of said record element, lever means connected to said cutting element for moving said cutting element to sever said record element, and means controlled by at least one of said differential means for selectively providing a fulcrum for said lever means to render said lever means effective and ineffective to actuate said cutting element.

16. In an accounting machine, a plurality of differential means operable to different data representing positions, recording means controlled by at least one of said differential means for recording corresponding data on a length of a record element, a cutting element for severing an end portion of said record element, lever means connected to said cutting element for moving said cutting element to sever said record element, drive means operable through a cycle of operation during each cycle of operation of the accounting machine, means connecting said drive means to said lever means so that said lever means is operated during each cycle of operation, and fulcrum means movable into and out of engagement with said lever means to render said lever means effective to actuate said cutting element only during selected ones of said cycles of operation.

17. The accounting machine set forth in claim 16 including means controlled by the position of at least one of said differential means for selectively moving said fulcrum means into and out of engagement with said lever means.

18. In an accounting machine, a plurality of differential means successively operable to different data representing positions, a plurality of type means successively operated by said differential means to corresponding settings, a housing enclosing said type means, first recording means for recording the data provided by said type means in sequence on a length of a first record element, second recording means for recording the data provided by said type means in sequence on a length of a second record element, first guide means for moving said first record element relative to said housing to visually display at the exterior of the housing all of the data provided by said plurality of type means except one portion thereof, and second guide means for moving said second record element relative to said housing to visually display at the exterior of the housing said one portion of the data supplied by said plurality of type means.

19. In an accounting machine, a plurality of differential means successively operable to different data representing positions, a plurality of recording elements successively set to corresponding data representing positions by said plurality of differential means, a housing enclosing said recording elements, first recording means in said housing for recording the data supplied by said recording elements on a length of a first record medium, second recording means in said housing for recording the data supplied by said second elements on a length of a second record medium, guide means for directing the recorded portion of said first record medium out of said housing to permit all but a given part of the data supplied by said record elements to be visually inspected externally of said housing, and an opening formed in said housing aligned with the portion of the length of said second record medium bearing the record of said given part of the data supplied by said record elements so that all of the data supplied by said record elements can be visually inspected externally of said housing.

20. In an accounting machine having a plurality of differential means operable to different data representing positions and recording means controlled by said differential means for recording corresponding data on a length of a record element, a cutting element for severing an end portion of said record element, lever means connected to said cutting element for moving said cutting element to sever said record element, controllable record feeding means including a variable travel mechanism for feeding different lengths of the record past the cutting element, a control structure settable to different positions and including a first portion providing a stop for the variable travel mechanism and a second portion providing a fulcrum for the lever means, coded means settable to more than two different settings in accordance with the mode of operation for which the machine is conditioned, and a linkage for sensing the coded means and moving the control structure to different corresponding settings to control the feeding of different lengths of the record and to selectively supply a fulcrum for the lever means.

21. The accounting machine set forth in claim 20 in which the control structure comprises a pivotally mounted yoke.

22. The accounting machine set forth in claim 20 in which the first portion of the control structure includes a coded portion providing different lengths of record movement.

References Cited by the Examiner
UNITED STATES PATENTS

| | | | |
|---|---|---|---|
| 2,747,794 | 5/1956 | Placke et al. | 101—93 X |
| 2,884,851 | 5/1959 | Werner et al. | 101—93 |
| 3,030,883 | 4/1962 | Shacklett | 101—227 X |
| 3,093,305 | 6/1963 | Englund | 235—23 X |

ROBERT E. PULFREY, *Primary Examiner.*

W. F. McCARTHY, *Assistant Examiner.*